United States Patent
Yoon et al.

(10) Patent No.: US 12,144,058 B2
(45) Date of Patent: *Nov. 12, 2024

(54) APPARATUS AND METHOD FOR MANAGING EVENTS IN COMMUNICATION SYSTEM

(71) Applicant: Samsung Electronics Co., Ltd., Suwon-si (KR)

(72) Inventors: Kangjin Yoon, Suwon-si (KR); Duckey Lee, Suwon-si (KR); Sujung Kang, Suwon-si (KR); Jonghoe Koo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,280

(22) Filed: Jul. 31, 2023

(65) Prior Publication Data

US 2023/0379685 A1 Nov. 23, 2023

Related U.S. Application Data

(63) Continuation of application No. 17/462,381, filed on Aug. 31, 2021, now Pat. No. 11,716,606.

(30) Foreign Application Priority Data

Aug. 31, 2020 (KR) .................. 10-2020-0110458

(51) Int. Cl.
*H04W 8/02* (2009.01)
(52) U.S. Cl.
CPC .................................... *H04W 8/02* (2013.01)
(58) Field of Classification Search
CPC ..................................................... H04W 8/02
See application file for complete search history.

(56) References Cited

U.S. PATENT DOCUMENTS

| | | |
|---|---|---|
| 9,009,475 B2 | 4/2015 | Hauck et al. |
| 10,574,780 B2 * | 2/2020 | Park ............... H04L 9/3234 |

(Continued)

FOREIGN PATENT DOCUMENTS

| | | |
|---|---|---|
| KR | 10-1996677 B1 | 7/2019 |
| WO | 2019/107876 A1 | 6/2019 |

OTHER PUBLICATIONS

International Search Report dated Nov. 26, 2021, issued in International Application No. PCT/KR2021/011705.

(Continued)

*Primary Examiner* — Barry W Taylor
(74) *Attorney, Agent, or Firm* — Jefferson IP Law, LLP

(57) ABSTRACT

The disclosure relates to a communication method and a system for converging a $5^{th}$-Generation (5G) communication system for supporting higher data rates beyond a $4^{th}$-Generation (4G) system with a technology for Internet of Things (IoT). The disclosure may be applied to intelligent services based on the 5G communication technology and the IoT-related technology, such as a smart home, a smart building, a smart city, a smart car, a connected car, health care, digital education, smart retail, security and safety services. A user equipment (UE) is provided. The UE includes a transceiver, and at least one processor, wherein the at least one processor controls the transceiver to transmit a first message requesting an event to an opening mediation server, receive event-related information from the opening mediation server in response to the first message, transmit a second message requesting an event to a profile providing server based on the event-related information, and receive information related to event processing from the profile providing server in response to the second message.

14 Claims, 9 Drawing Sheets

(56) References Cited

U.S. PATENT DOCUMENTS

| | | |
|---|---|---|
| 11,109,220 B1* | 8/2021 | Shah .................... H04W 8/183 |
| 11,716,606 B2* | 8/2023 | Yoon ..................... H04W 8/02 |
| | | 455/435.1 |
| 2014/0308991 A1 | 10/2014 | Lee et al. |
| 2016/0020802 A1 | 1/2016 | Lee et al. |
| 2016/0088464 A1 | 3/2016 | Hans |
| 2019/0140837 A1 | 5/2019 | Cheng et al. |
| 2019/0181901 A1* | 6/2019 | Namiranian ............ H04L 63/08 |
| 2019/0268757 A1* | 8/2019 | Yi ........................ H04W 60/00 |
| 2020/0015069 A1* | 1/2020 | Anslot ................ H04W 12/069 |
| 2020/0389785 A1 | 12/2020 | Lee et al. |
| 2022/0141643 A1* | 5/2022 | Balasubramanian ........................ |
| | | H04W 12/06 |
| | | 455/558 |

OTHER PUBLICATIONS

Extended European Search Report dated Oct. 6, 2023, issued in European Patent Application No. 21862165.4.

* cited by examiner

APPARATUS AND METHOD FOR MANAGING EVENTS IN COMMUNICATION SYSTEM

CROSS-REFERENCE TO RELATED APPLICATION(S)

This application is a continuation application of prior application Ser. No. 17/462,381, filed on Aug. 31, 2021, which is based on and claims priority under 35 U.S.C. § 119(a) of a Korean patent application number 10-2020-0110458, filed on Aug. 31, 2020, in the Korean Intellectual Property Office, the disclosure of which is incorporated by reference herein in its entirety.

BACKGROUND

1. Field

The disclosure relates to a method and an apparatus wherein a profile server registers events in at least one opening mediation server or deletes events therefrom. More particularly, the disclosure relates to a method and an apparatus for downloading a communication service to a terminal and installing the communication service, thereby connecting communication in a communication system.

The disclosure relates to a method and an apparatus for downloading, installing, and managing profiles online in a communication system.

2. Description of Related Art

To meet the demand for wireless data traffic having increased since deployment of $4^{th}$-Generation (4G) communication systems, efforts have been made to develop an improved $5^{th}$-Generation (5G) or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

With the advance of wireless communication systems, various services can be provided as described above, and accordingly there is a need for schemes to efficiently provide these services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for downloading a communication service to a terminal and installing the communication service, thereby connecting communication in a communication system.

Another aspect of the disclosure is to provide a bundle or a profile installed in one device that can be transmitted and installed to another device through one of various available options.

Additional aspects will be set forth in part in the description which follows and, in part, will be apparent from the description, or may be learned by practice of the presented embodiments.

In accordance with an aspect of the disclosure, a method performed by a server in a wireless communication system is provided. The method includes receiving, from a mobile network operator, a first message including an embedded universal integrated circuit card (eUICC) identifier and information on an opening mediation server, generating an event based on the first message, registering the event in at least one opening mediation server based on the first message, receiving, from a UE (User Equipment), a second message for requesting the event, and performing an event corresponding to an event identifier included in the second message.

In an embodiment of the disclosure, further comprising transmitting, to the at least one opening mediation server, a request message for requesting deletion of the event in case that the event identifier is unrecognizable, and receiving, from the at least one opening mediation server, a response message including a deletion result of the event.

In an embodiment of the disclosure, wherein the at least one opening mediation server includes a first opening mediation server and a second opening mediation server, and wherein the first message includes first information on the first opening mediation server and second information on the second opening mediation server.

In an embodiment of the disclosure, wherein the transmitting of the request message for requesting deletion of the event comprises identifying an opening mediation server list in which the event is registered based on the event identifier, and transmitting, to the first opening mediation server and the second opening mediation server, the request message for requesting deletion of the event in case that it is recognized that the same event has been registered in the first opening mediation server and the second opening mediation server.

In an embodiment of the disclosure, further comprising transmitting, to the at least one opening mediation server, a third message based on the first message, and receiving, from the at least one opening mediation server, a fourth message including an event registration result.

In an embodiment of the disclosure, further comprising determining whether an information list of at least one alternative opening mediation server is present based on the first message, and transmitting a message for requesting event registration to a specific opening mediation server within the information list of the at least one alternative opening mediation server.

In an embodiment of the disclosure, further comprising determining whether an information list of at least one root opening mediation server is present in case that the information list of the at least one alternative opening mediation server is not present, and transmitting the message for requesting event registration to all the opening mediation servers within the information list of the at least one root opening mediation server.

In an embodiment of the disclosure, wherein the information on the opening mediation server includes at least one of a fully qualified domain name (FQDN) and an object identifier IP address.

In accordance with another aspect of the disclosure, a server is provided. The server includes a transceiver configured to transmit and receive at least one signal, and a controller configured to be coupled to the transceiver, wherein the controller is configured to receive, from a mobile network operator, a first message including an eUICC identifier and information of an opening mediation server, generate an event based on the first message, register the event in at least one opening mediation server based on the first message, receive, from a user equipment (UE), a second message for requesting the event, and perform an event corresponding to an event identifier included in the second message.

Various embodiments of the disclosure may provide a method and an apparatus wherein a terminal selects a communication service in a communication system so as to connect communication.

Various embodiments of the disclosure may provide a method and an apparatus wherein a terminal downloads a profile for communication connection online, installs the same, and manages the same.

Various embodiments of the disclosure may provide a method and an apparatus wherein a terminal can efficiently downloads an event in a communication system.

Various embodiments of the disclosure may provide a method and an apparatus wherein a terminal accesses at least one opening mediation server and acquires an event allocated to the terminal.

Various embodiments of the disclosure may provide a method and an apparatus wherein, when a terminal accesses at least one opening mediation server or profile providing server, event information and information (SM-DS Info) of at least one opening mediation server accessed for event acquisition are notified.

Various embodiments of the disclosure may provide a method and an apparatus wherein a profile providing server registers an identical event in at least one opening mediation server.

Various embodiments of the disclosure may provide a method and an apparatus wherein a profile providing server deletes an event registered in at least one opening mediation server.

Various embodiments of the disclosure may provide a method and an apparatus for exchanging messages between an opening mediation server (SM-DS) and a profile providing server (SM-DP+).

In order to address the above-mentioned issues, the disclosure may provide a control signal processing method in a wireless communication system, the control signal processing method including receiving a first control signal transmitted from a base station, processing the received first control signal, and transmitting a second control signal generated based on the processing to the base station.

In accordance with another aspect of the disclosure, a terminal in a wireless communication system is provided. The terminal includes a transceiver, and a controller, wherein the controller controls the transceiver to transmit a first message requesting an event to an opening mediation server, receive event-related information from the opening mediation server in response to the first message, transmit a second message requesting an event to a profile providing server based on the event-related information, and receive information related to event processing from the profile providing server in response to the second message.

In accordance with another aspect of the disclosure, a profile providing server in a wireless communication system is provided. The profile providing server includes a transceiver, and a controller, wherein the controller controls the transceiver to generate an event and receive an event registration request message to at least one opening mediation server from an operator server, and controls the transceiver to generate an event corresponding to the request message and register the event in at least one opening mediation server.

In accordance with another aspect of the disclosure, an opening mediation server in a wireless communication system is provided. The opening mediation server includes a transceiver, and a controller, wherein the controller controls the transceiver to receive an event registration request message from a profile providing server or another opening mediation server to register an event, and registers the event in response to the event registration request message, and wherein the event is related to an event generated by the profile providing server.

In accordance with another aspect of the disclosure, a profile providing server in a wireless communication system is provided. The profile providing server includes a transceiver, and a controller, wherein the controller controls the transceiver so as to receive an event request message from a terminal, determines the validity of event-related information included in the event request message, and controls the transceiver so as to transmit information regarding event processing, based on the determination regarding the validity of the event-related information.

The technical subjects pursued in the disclosure may not be limited to the above-mentioned technical subjects, and other technical subjects which are not mentioned may be clearly understood, through the following descriptions, by those skilled in the art to which the disclosure pertains.

According to various embodiments of the disclosure, a terminal in a communication system may request an event registered in at least one opening mediation server.

According to various embodiments of the disclosure, a profile providing server in a communication may generate an event at the request of an operator server and may register the corresponding event in at least one opening mediation server.

In accordance with another aspect of the disclosure, a profile providing server in a communication system is provided. The profile providing server includes a message, when requesting an opening mediation server to register an event, configured such that, after the opening mediation server registers the event, a third opening mediation server is requested to register an event corresponding to the event.

According to various embodiments of the disclosure, when an opening mediation server in a communication system requests a profile providing server or another opening mediation server to register an event, and if a message is included which requests a third opening mediation server to register an event, the opening mediation server may register the event, generate another event corresponding to the event, and then register the event in the requested third opening mediation server.

According to various embodiments of the disclosure, when a terminal in a communication system accesses an opening mediation server or a profile providing server and requests an event, the terminal may provide information of the previously accessed opening mediation server (SM-DS Info), thereby assisting deletion of unnecessary events.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
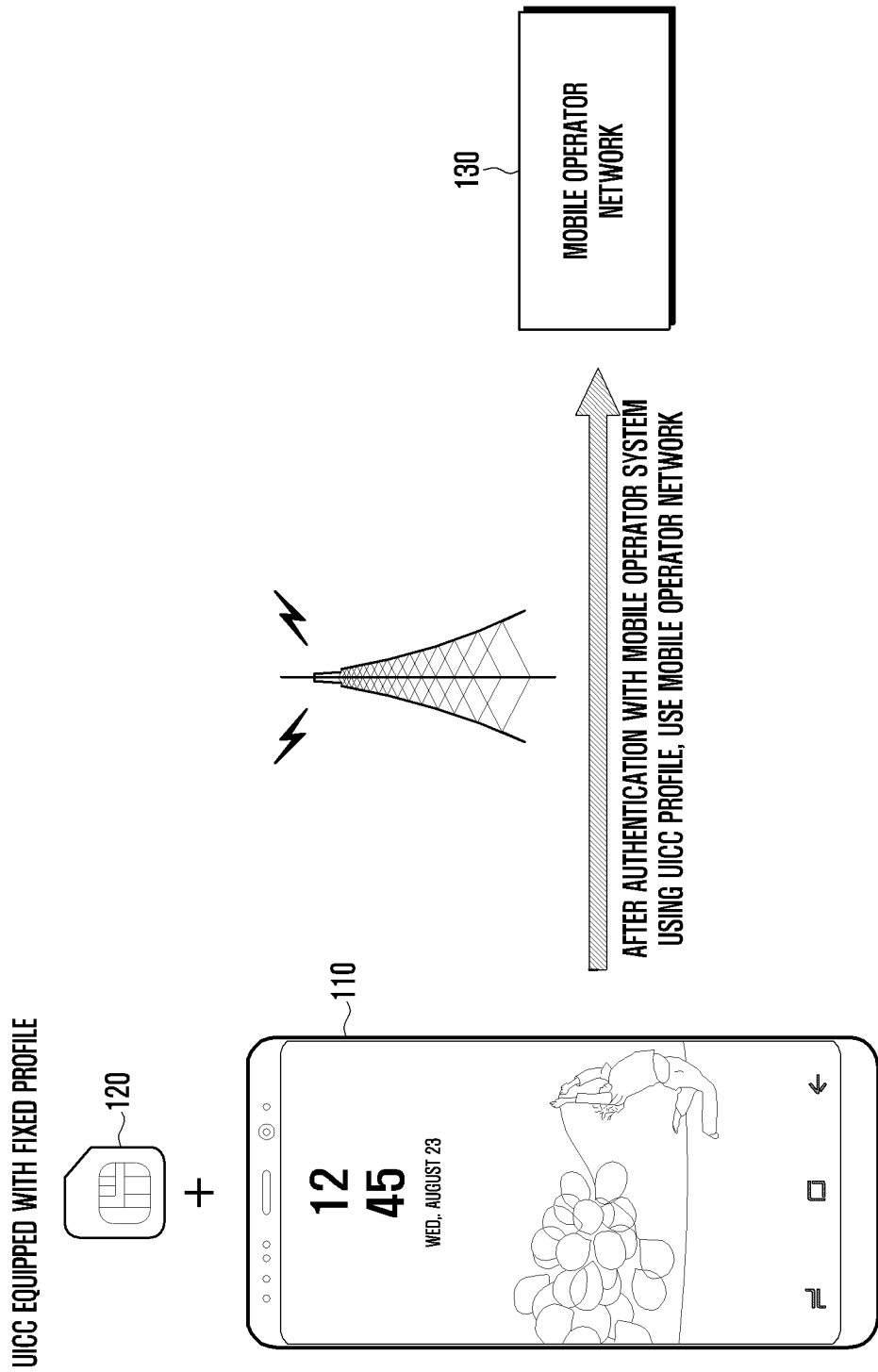
FIG. 1 is a diagram illustrating a method of connecting a user equipment (UE) to a mobile communication network using a universal integrated circuit card (UICC) having a fixed profile mounted thereon according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

Specific terms used in the following description are provided to help the understanding of the disclosure, and the use of these specific terms may be changed to other forms without departing from the technical spirit of the disclosure.

First, terms used in the disclosure are defined.

A universal integrated circuit card (UICC) is a smart card inserted into a mobile communication terminal and used, and is also called a UICC card. The UICC may include an access control module for accessing a network of a mobile operator. Examples of the access control module include a universal subscriber identity module (USIM), a subscriber identity module (SIM), an IP multimedia service identity module (ISIM), and the like. A UICC including a USIM is usually called a USIM card. Similarly, a UICC including a SIM module is commonly referred to as a SIM card.

The terms "SIM card", "UICC card", "USIM card", and "UICC including ISIM" disclosed in the disclosure may be used as the same meaning in the disclosure. For example, even for a SIM card, the technical application can be equally applied to a USIM card, an ISIM card, or a general UICC card.

The SIM card may store personal information of mobile communication subscribers, and may perform subscriber authentication and traffic security key generation when accessing a mobile communication network, thereby enabling safe mobile communication use.

At the time of proposing the disclosure, a SIM card is generally manufactured as a dedicated card for a corresponding operator at the request of a specific mobile communication operator during card manufacturing, and authentication information for network access of the corresponding operator, for example, a universal subscriber identity module (USIM) application, international mobile subscriber identity (IMSI), K value, OPc value, or the like, are loaded on the card in advance and shipped. Therefore, the manufactured SIM card is delivered to a corresponding mobile operator and provided to subscribers. After that, if necessary, it is possible to manage the installation, modification, and deletion of applications within the UICC by using technologies, such as over-the-air (OTA). The subscribers can use the network and application services of a corresponding mobile operator by inserting a UICC card into their own mobile communication terminals. When replacing the terminal, by moving and inserting the UICC card from an existing terminal to a new terminal, authentication information, mobile communication phone number, and personal phone book stored in the UICC card can be used as it is in the new terminal.

However, the SIM card is inconvenient for users of mobile communication terminals to receive services from other mobile operators. It is inconvenient for a user of a mobile communication terminal to physically obtain a SIM card in order to receive a service from a mobile operator. For example, when traveling to another country, it is inconvenient to obtain a local SIM card in order to receive a local mobile communication service. In the case of roaming service, it solves the inconvenience to some extent, but the fee is relatively high, and there is a problem that the service cannot be received if there is no contract between the mobile operators.

Meanwhile, when a SIM module is remotely downloaded and installed on the UICC card, this inconvenience can be largely solved. For example, a SIM module of a mobile communication service that a user wants to use at a desired time can be downloaded to the UICC card. Such a UICC card can also be used by downloading and installing a plurality of SIM modules and selecting only one SIM module among them. Such a UICC card may or may not be fixed to the terminal. In particular, a UICC that is fixed to a terminal and used is called an embedded UICC (eUICC). In general, the eUICC refers to a UICC card that is fixed to the terminal and used, and can download and select a SIM module remotely. In the disclosure, a UICC card that can remotely download and select a SIM module is collectively referred to as an eUICC. For example, among the UICC cards that can remotely download and select the SIM module, UICC cards that are fixed or not fixed to the terminal are collectively used as eUICCS. In addition, the downloaded SIM module information is collectively used as the term eUICC profile or, more simply, profile.

Hereinafter, the terms used in the disclosure will be described.

In the disclosure, UICC is a smart card that is inserted into a mobile communication terminal and used, and personal information, such as network access authentication information, phone book, and SMS of a mobile communication subscriber is stored in the UICC. When accessing a mobile communication network, such as GSM, WCDMA, LTE, or the like, the UICC refers to a chip that enables secure mobile communication by performing subscriber authentication and traffic security key generation. The UICC is loaded with communication applications, such as subscriber identification module (SIM), universal SIM (USIM), and IP Multimedia SIM (ISIM) depending on the type of mobile communication network the subscriber accesses, and may provide a high-level security function for loading various applications, such as electronic wallet, ticketing, e-passport, or the like.

In the disclosure, an eUICC (embedded UICC) is a security module in the form of a chip embedded in a terminal, not a removable type that can be inserted into and removed from the terminal. The eUICC can download and install a profile using over-the-air (OTA) technology. The eUICC can be named as a UICC that can download and install a profile.

In the disclosure, a method of downloading and installing a profile using the OTA technology in the eUICC may be applied to a removable UICC that can be inserted into and removed from a terminal. For example, an embodiment of the disclosure can be applied to a UICC that can download and install a profile using the OTA technology.

In this disclosure, the term UICC may be used interchangeably with SIM, and the term eUICC may be used interchangeably with eSIM.

In the disclosure, a profile may mean that an application, a file system, an authentication key value, or the like, stored in the UICC are packaged in the form of software.

In the disclosure, a USIM Profile may have the same meaning as a profile or may mean that information included in a USIM application within the profile is packaged in the form of software.

In the disclosure, an operation of a terminal enabling a profile means an operation of changing the state of the profile to an enabled state and configuring the terminal to receive a communication service through a mobile operator that provided the profile. The profile in the enabled state may be expressed as an "enabled profile".

In the disclosure, an operation of a terminal disabling a profile means an operation of changing the state of the profile to a disabled state and configuring the terminal not to receive a communication service through a mobile operator that provided the profile. The profile in the disabled state may be expressed as a "disabled profile".

In the disclosure, an operation of a terminal deleting a profile may mean an operation of changing the state of the profile to a deleted state and configuring the terminal so that the profile can no longer be enabled or disabled. The profile in the deleted state may be expressed as a "deleted profile".

In the disclosure, an operation of a terminal enabling, disabling, or deleting a profile may mean an operation of only marking each profile as to be enabled, to be disabled, or to be deleted without immediately changing the state of each profile to the enabled state, the disabled state, or the deleted state, and changing the state of each profile to be enabled, disabled, or deleted after the terminal or the UICC of the terminal performs a specific operation (e.g., performing a refresh (REFRESH) or initialization (RESET) command). The operation of marking a specific profile to be in a predetermined state (i.e., to be enabled, to be disabled, or to be deleted) is not necessarily limited to displaying one predetermined state for one profile. It is also possible to display one or more profiles in the same or different predetermined states, display one profile in one or more predetermined states, or display one or more profiles in one or more predetermined states equal to or different from each other, respectively.

In addition, when the terminal displays one or more predetermined states for an arbitrary profile, the two displays may be combined into one. For example, when a certain profile is marked as to be disabled and to be deleted, the profile may also be combined and displayed as to be disabled and deleted.

In addition, an operation of a terminal displaying the predetermined state for one or more profiles may be performed sequentially or simultaneously. In addition, an operation of a terminal displaying the predetermined state for one or more profiles and then changing the actual profile state may be performed sequentially or simultaneously.

In the disclosure, the profile providing server includes a function of generating a profile, encrypting a generated profile, generating a profile remote management command, or encrypting a generated profile remote management command, and may be expressed as subscription manager data preparation (SM-DP), subscription manager data preparation plus (SM-DP+), off-card entity of profile domain, profile encryption server, profile creation server, profile provisioner (PP), profile provider, and profile provisioning credentials holder (PPC holder).

In the disclosure, the profile management server may be expressed as subscription manager secure routing (SM-SR), subscription manager secure routing plus (SM-SR+), off-card entity of eUICC profile manager or profile management credentials holder (PMC holder), and eUICC Manager (EM).

When referring to the profile providing server in the disclosure, it may also refer to a combination of the functions of the profile management server. Therefore, in various embodiments of the disclosure, that is, in the following description, the operation of the profile providing server is also possible in the profile management server. In the same manner, obviously, operations describing the profile management server or SM-SR may be performed in the profile providing server.

In the disclosure, the opening mediation server may be expressed as a subscription manager discovery service (SM-DS), a discovery service (DS), a root opening mediation server (root SM-DS), and an alternative opening mediation server (alternative SM-DS). The opening mediation server may receive an event registration request (register event request or event register request) from one or more profile providing servers or opening mediation servers. In addition, one or more opening mediation servers may be used in combination. In this case, a first opening mediation server may receive an event registration request from a second opening mediation server as well as the profile providing server.

In the disclosure, the profile providing server and the opening mediation server may be collectively referred to as "remote SIM provisioning (RSP) server". The RSP server may be expressed as subscription manager XX (SM-XX).

In the disclosure, eSIM capability may be collectively referred to as "remote SIM provisioning capability, or RSP capability".

The term "terminal" used in the disclosure is a mobile station (MS), user equipment (UE), user terminal (UT), wireless terminal, access terminal (AT), terminal, subscriber unit, subscriber station (SS), wireless device, wireless communication device, wireless transmit/receive unit (WTRU), mobile node, mobile, or other terms. Various embodiments of the terminal include cellular phones, smart phones having a wireless communication function, personal digital assistants (PDAs) having a wireless communication function, wireless modems, portable computers having a wireless communication function, photographing devices, such as a digital camera having a wireless communication function, gaming devices having a wireless communication function, music storage and playback home appliances having a wireless communication function, and Internet home appliances capable of wireless Internet access and browsing, as well as portable units or terminals incorporating combinations of such functions. In addition, the terminal may include a machine to machine (M2M) terminal and a machine type communication (MTC) terminal/device, but is not limited thereto. In the disclosure, a terminal may be referred to as an electronic device.

In the disclosure, the electronic device may have a built-in UICC that can download and install a profile. When the UICC is not embedded in the electronic device, the UICC physically separated from the electronic device may be inserted into the electronic device and connected to the electronic device. For example, the UICC in the form of a card may be inserted into the electronic device. The electronic device may include a terminal, and in this case, the terminal may be a terminal including a UICC that can download and install a profile. The UICC may be embedded in the terminal, and when the terminal and the UICC are separated, the UICC may be inserted into the terminal and connected to the terminal. The UICC that can download and install a profile may be referred to as, for example, eUICC.

In the disclosure, the terminal or electronic device may include software or an application installed in the terminal or electronic device to control the UICC or eUICC. The software or application installed in the terminal or electronic device to control the UICC or eUICC may be referred to as, for example, a local profile assistant (LPA).

In the disclosure, a profile identifier may be referred to as a factor matching a profile ID, an integrated circuit card ID (ICCID), a matching ID, an event ID, an activation code, an activation code token, a command code, a command code token, a signed command code, an unsigned command code, an ISD-P, or profile domain (PD). The profile ID may indicate a unique identifier of each profile. The profile ID may further include the address of the profile providing server (SM-DP+) that can index the profile. In addition, the profile ID may further include a signature of the profile providing server (SM-DP+).

In the disclosure, an eUICC identifier (eUICC ID) may be a unique identifier of the eUICC embedded in the terminal, and may be referred to as an EID. In addition, when a provisioning profile is pre-loaded in the eUICC, the eUICC ID may be a profile ID of a corresponding provisioning profile. In addition, as in an embodiment of the disclosure, when the terminal and the eUICC chip are not separated, the eUICC ID may be a terminal ID. In addition, the eUICC ID may refer to a specific secure domain of the eUICC chip.

In the disclosure, a profile container may be called a profile domain. The profile container may be a security domain.

In the disclosure, an application protocol data unit (APDU) may be a message for the terminal to interwork with the eUICC. In addition, the APDU may be a message for the PP or PM to interwork with the eUICC.

In the disclosure, profile provisioning credentials (PPC) may be a means used for mutual authentication, profile encryption, and signature between the profile providing server and the eUICC. The PPC may include one or more of a symmetric key, a Rivest Shamir Adleman (RSA) certificate and a private key, an elliptic curved cryptography (ECC) certificate and a private key, a root certification authority (CA), and a certificate chain. In addition, when there are a plurality of profile providing servers, different PPCs for each of the plurality of profile providing servers may be stored or used in the eUICC.

In the disclosure, profile management credentials (PMC) may be a means used for mutual authentication and transmission data encryption and signing between the profile management server and the eUICC. The PMC may include one or more of a symmetric key, an RSA certificate and a private key, an ECC certificate and a private key, a root CA, and a certificate chain. In addition, when there are a plurality of profile management servers, different PMCs for each of the plurality of profile management servers can be stored or used in the eUICC.

In the disclosure, an AID may be an application identifier. This value may be a delimiter that distinguishes different applications within the eUICC.

In the disclosure, an event may be a general term for profile download, remote profile management, or other profile or eUICC management/processing commands. The event may be named as a remote SIM provisioning operation (RSP operation) or an event record, and each event may be referred to as data including at least one of a corresponding event identifier (event ID or EventID) or matching identifier (Matching ID or MatchingID), the address (FQDN, IP address, or URL) of a profile providing server (SM-DP+) or an opening mediation server in which the event is stored, the signature of the profile providing server (SM-DP+) or the opening mediation server (SM-DS), and the digital certificate of the profile providing server (SM-DP+) or the opening mediation server (SM-DS). Data corresponding to the event may be referred to as an activation code or a command code. A part or all of a procedure for using a command code may be referred to as "activation code processing procedure", "command code processing procedure", "activation code procedure", "command code procedure", "local profile assistant application programming interface (LPA API) procedure", "LPA API procedure", or "LPA API processing procedure". The profile download may be mixed with profile installation. In addition, an event type may also be used as a term to indicate whether a particular event is a profile download, remote profile management (e.g., delete, enable, disable, replace, update, or the like), or other profile or eUICC management/processing command, and may be named as an operation type, an operation class (OperationClass), an event request type, an event classification (Event Class), an event request classification (Event Request Class), or the like. As for an arbitrary event identifier (EventID or MatchingID), a path or usage purpose (EventID Source or MatchingID Source) from which the terminal obtained the corresponding event identifier (EventID or MatchingID) may be designated.

In the disclosure, a profile package may be used interchangeably with a profile or may be used as a term indicating a data object of a specific profile, and may be named as a profile TLV or a profile package TLV. When the profile package is encrypted using an encryption parameter, it may be named as a protected profile package (PPP) or a protected profile package TLV (PPP TLV). When the profile package is encrypted using an encryption parameter that can only be decrypted by a specific eUICC, the profile package may be named as a bound profile package (BPP) or a bound profile package TLV (BPP TLV). The profile package TLV may be a data set expressing information constituting a profile in a TLV (tag, length, value) format.

In the disclosure, local profile management (LPM) may be named as profile local management, local management, local management command, local command, local profile management package (LPM Package), a profile local management package, a local management package, a local management command package, or a local command package. The LPM may be used for updating the states (enabled, disabled, or deleted) of a specific profile through software installed in a terminal, or updating the contents of a specific profile (e.g., a profile nickname or profile summary information (profile metadata), or the like). The LPM may include one or more local management commands. In this case, a target profile of each local management command may be the same or different for each local management command.

In the disclosure, remote profile management (RPM) may be named as profile remote management, remote management, remote management command, remote command, remote profile management package (RPM Package), profile remote management package, remote management package, remote management command package, and remote command package. The RPM may be used for updating the states (enabled, disabled, or deleted) of a specific profile or updating the contents of a specific profile (e.g., a profile nickname, or profile summary information (Profile Metadata), or the like). The RPM may include one or more remote management commands. In this case, a target profile of each remote management command may be the same or different for each remote management command.

In the disclosure, a certificate or digital certificate may indicate a digital certificate used in asymmetric key-based mutual authentication including a pair of a public key (PK) and a secret key (SK). Each certificate includes one or more public keys (PK), a public key identifier (PKID) corresponding to each public key, and an identifier and digital signature of a certificate issuer (CI) that issued the corresponding certificate.

In addition, the certificate issuer may be named as a certification issuer, a certificate authority (CA), a certification authority, and the like.

In the disclosure, a public key (PK) and a public key identifier (PKID) may be used interchangeably with the same meaning as a certificate including a specific public key or a corresponding public key, a part of a specific public key or a part of a certificate including a corresponding public key, an operation result (e.g., Hash) value of a specific public key and an operation result (e.g., Hash) value of a certificate including a corresponding public key, an operation result (e.g., Hash) value of a part of a specific public key and an operation result (e.g., Hash) value of a part of a certificate including a corresponding public key, or a storage space in which data is stored.

In the disclosure, certificates (primary certificate) issued by one certificate issuer are used to issue another certificate (secondary certificate), or when secondary certificates are used to issue tertiary or higher certificates in conjunction, the correlation between the certificates can be named as certificate chain or certificate hierarchy. At this time, a CI certificate used for the initial certificate issuance is root of certificate, top certificate, root CI, root CI certificate, root CA, or root CA certificate.

In the disclosure, a mobile operator may be collectively referred to all of a business that provides a communication service to a terminal, a business supporting system (BSS), an operational supporting system (OSS), a point of sale (POS) terminal, and other IT systems. In addition, in the disclosure, the communication operator is not limited to expressing only one specific business entity that provides communication services, and the communication operator may be used as a term referring to a group or association (association or consortium) of one or more businesses or a representative representing the group or association. In addition, in the disclosure, the mobile operator may be named as an operator (OP or Op.), a mobile network operator (MNO), a service provider (SP), a profile owner (PO), or the like, and each mobile operator may configure or be assigned at least one name and/or an object identifier (OID) of the mobile operator. When the mobile operator refers to a group or association or representative of more than one business entity, the name or unique identifier of an arbitrary group or association or representative can be a name or a unique identifier shared by all entities affiliated with the corresponding group or association or all entities collaborating with the representative.

In the disclosure, AKA may indicate authentication and key agreement, and may indicate an authentication algorithm for accessing 3GPP and 3GPP2 networks.

In the disclosure, K is an encryption key value stored in an eUICC used for the AKA authentication algorithm.

In the disclosure, OPc is a parameter value that may be stored in the eUICC used for the AKA authentication algorithm.

In the disclosure, NAA is a network access application program, and may be an application program, such as USIM or ISIM stored in UICC to access a network. The NAA may be a network access module.

In the disclosure, an indicator may be used for expressing that an arbitrary function, configuration, or operation is required or not required, or may also be used for expressing the corresponding function, configuration, or operation itself. In addition, in the disclosure, the indicator may be expressed in various forms, such as a character string or an alphanumeric string, an operator representing true/false (Boolean—TRUE or FALSE), a bitmap, an array, or the like. Other expressions with the same meaning can be mixed.

In describing the disclosure, if it is determined that a detailed description of a related known function or configuration may unnecessarily obscure the gist of the disclosure, the detailed description thereof will be omitted.

FIG. 1 is a diagram illustrating a method of connecting a UE to a mobile communication network using a UICC having a fixed profile mounted thereon according to an embodiment of the disclosure.

Referring to FIG. 1, a UICC 120 may be inserted into a UE 110. For example, the UICC 120 may be removable or may be pre-built in the UE.

A fixed profile of UICC loaded with a fixed profile means that "access information" that can access a specific mobile operator is fixed. For example, the access information may be an IMSI that is a subscriber identifier and a K or Ki value required to be authenticated to a network together with the IMSI.

The UE 110 according to various embodiments may perform authentication with an authentication processing system (e.g., home location register (HLR) or AuC) of a mobile operator using the UICC 120. For example, the authentication process may be an authentication and key agreement (AKA) process. When the authentication is successful, the UE can use a mobile communication service, such as a phone call or use of mobile data using a network 130 of the mobile operator of a mobile communication system.

Figure 2:
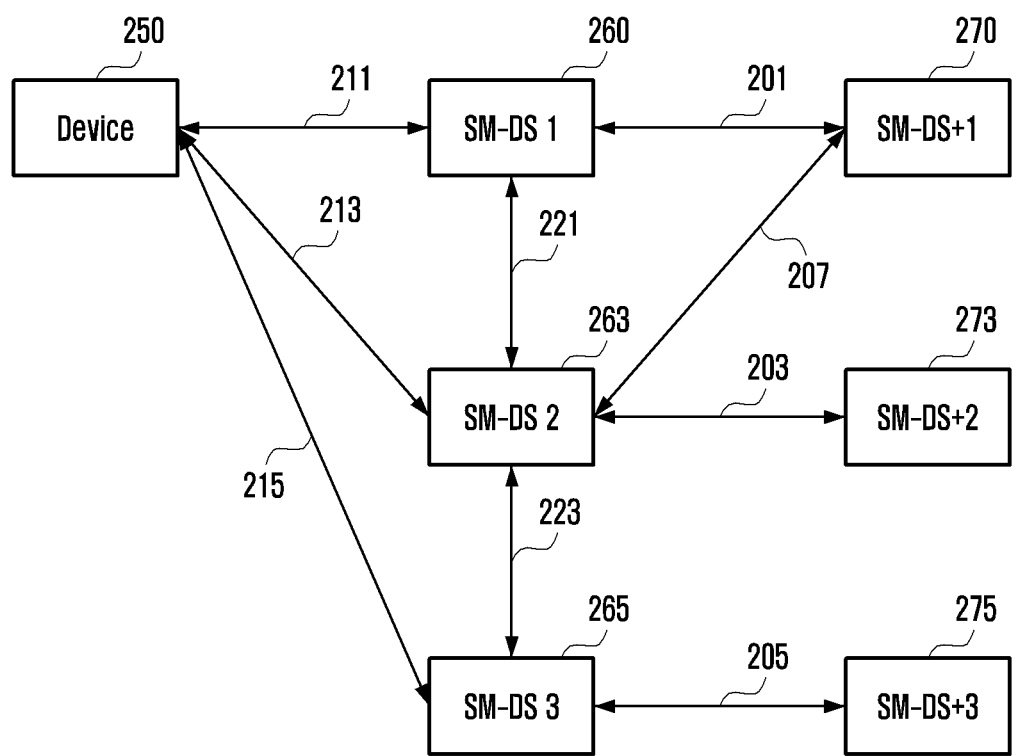
FIG. 2 is a diagram illustrating a connection between a UE, an opening mediation server, and a profile providing server according to an embodiment of the disclosure.

FIG. 2 is a diagram illustrating a connection between a UE, an opening mediation server, and a profile providing server according to an embodiment of the disclosure.

Referring to FIG. 2, a UE 250 can be connected to a first opening mediation server 260, a second opening mediation server 263, and a third opening mediation server 265 with a link 211, a link 213, and a link 215, respectively.

For example, the addresses (FQDN, IP Address, or URL) of the first opening mediation server 260, the second opening mediation server 263, and the third opening mediation server 265 may be stored in the UE 250 or the eUICC included in the UE 250. In this case, the first opening mediation server 260, the second opening mediation server 263, and the third opening mediation server 265 may be referred to as root opening mediation servers (Root SM-DS).

In addition, when only the address of the first opening mediation server 260 is stored in the UE 250 or the eUICC included in the UE, the address of the second opening mediation server 263 may be notified to the UE through the first opening mediation server 260. To this end, the second opening mediation server 263 may register its own address in the first opening mediation server 260 through the link 221. In this case, the first opening mediation server 260 and the second opening mediation server 263 may be referred to as a root opening mediation server (Root SM-DS) and an alternative opening mediation server (Alternative SM-DS), respectively.

In addition, when only the address of the first opening mediation server 260 is stored in the UE 250 or the eUICC included in the UE, the address of the second opening mediation server 263 may be notified to the UE through the first opening mediation server 260. In addition, the address of the third opening mediation server 265 may be notified to the UE through the second opening mediation server 263. To this end, the second opening mediation server 263 may register its own address in the first opening mediation server 260 through the link 221, and the third opening mediation server 265 may register its own address in the second opening mediation server 263 through the link 223. In this case, the first opening mediation server 260 may be referred to as a root opening mediation server (Root SM-DS), and the second opening mediation server 263 and the third opening mediation server 265 are alternative mediation servers. (alternative SM-DS).

In addition, when only the addresses of the first opening mediation server 260 and the third opening mediation server 265 are stored in the UE 250 or the eUICC included in the UE, the address of the second opening mediation server 263 may be notified to the UE through the first opening mediation server 260 or the third opening mediation server 265. In this case, the first opening mediation server 260 and the third opening mediation server 265 may be referred to as a root opening mediation server (Root SM-DS), and the second opening mediation server 263 is an alternative opening mediation server (alternative SM-DS).

As shown in FIG. 2, the first opening mediation server 260 may be connected to a first profile providing server 270 through the link 201. For example, the first profile providing server 270 may generate a specific event and may register the generation of the corresponding event in the first opening mediation server 260 through the link 201.

As shown in FIG. 2, the first profile providing server 270 may be connected to the first opening mediation server 260 and the second opening mediation server 263 through the link 201 and the link 207, respectively. For example, the first profile providing server 270 may generate a specific event, and may register the generation of the event in the first opening mediation server 260 and the second opening mediation server 263 through the link 201 and the link 207, respectively.

As shown in FIG. 2, the second profile providing server 273 may be indirectly connected to the first opening mediation server 260 through the second opening mediation server 263. For example, when generating a specific event and registering the generation of the event in the second opening mediation server 263 through the link 203, the second profile providing server 273 may request to forward the generating and the registering of the generation to the first opening mediation server 260. In this case, the second profile providing server 273 may make a request including information of the first opening mediation server 260. In this case, the second opening mediation server 263 may re-register the event of the second profile providing server 273 in the first opening mediation server 260 through the link 221. The information of the first opening mediation server 260 provided by the second profile providing server 273 may include at least one of the following information.

Forwarding Indicator

Fully Qualified Domain Name (FQDN) of opening mediation server to be forwarded

Unique object identifier (Object ID or OID) of opening mediation server to be forwarded IP address of opening mediation server to be forwarded URL for calling a specific function of opening mediation server to be forwarded As show in FIG. 2, the third profile providing server 275 may be indirectly connected to the first opening mediation server 260 through the third opening mediation server 265 and the second opening mediation server 263. For example, when generating a specific event and registering the generation of the event in the third opening mediation server 265 through the link 205, the third profile providing server 275 may request to sequentially forward the generating and the registering of the generation to the second opening mediation server 263 and the first opening mediation server 260. In this case, the third profile providing server 275 may request this while including information of the second opening mediation server 263 and the first opening mediation server 260. In this case, the third opening mediation server 265 may re-register the event of the third profile providing server 275 in the second opening mediation server 263 through the link 223.

As shown in FIG. 2, the second profile providing server 273 may be indirectly connected to the first opening mediation server 260 to the third opening mediation server 265 through the second opening mediation server 263. For example, when generating a specific event and registering the generation of the corresponding event in the second opening mediation server 263 through the link 203, the second profile providing server 273 may request to forward the generating and the registering of the generation to the first opening mediation server 260 to the third opening mediation server 265. In this case, the second profile providing server 273 may request this while including information of the first opening mediation server 260 to the third opening mediation server 265. In this case, the second opening mediation server 263 may re-register the event of the second profile providing server 273 in the first opening mediation server 260 through the link 221. In addition, the second opening mediation server 263 may re-register the event of the second profile providing server 273 in the third opening mediation server 265 through the link 223.

The UE 250, detailed operations and message exchange procedures among the first opening mediation server 260, the second opening mediation server 263, the third opening mediation server 265, the first profile providing server 270, the second profile providing server 273, and the third profile providing server 275 according to various embodiments will be described later with reference to FIGS. 3 to 4.

Figure 3:
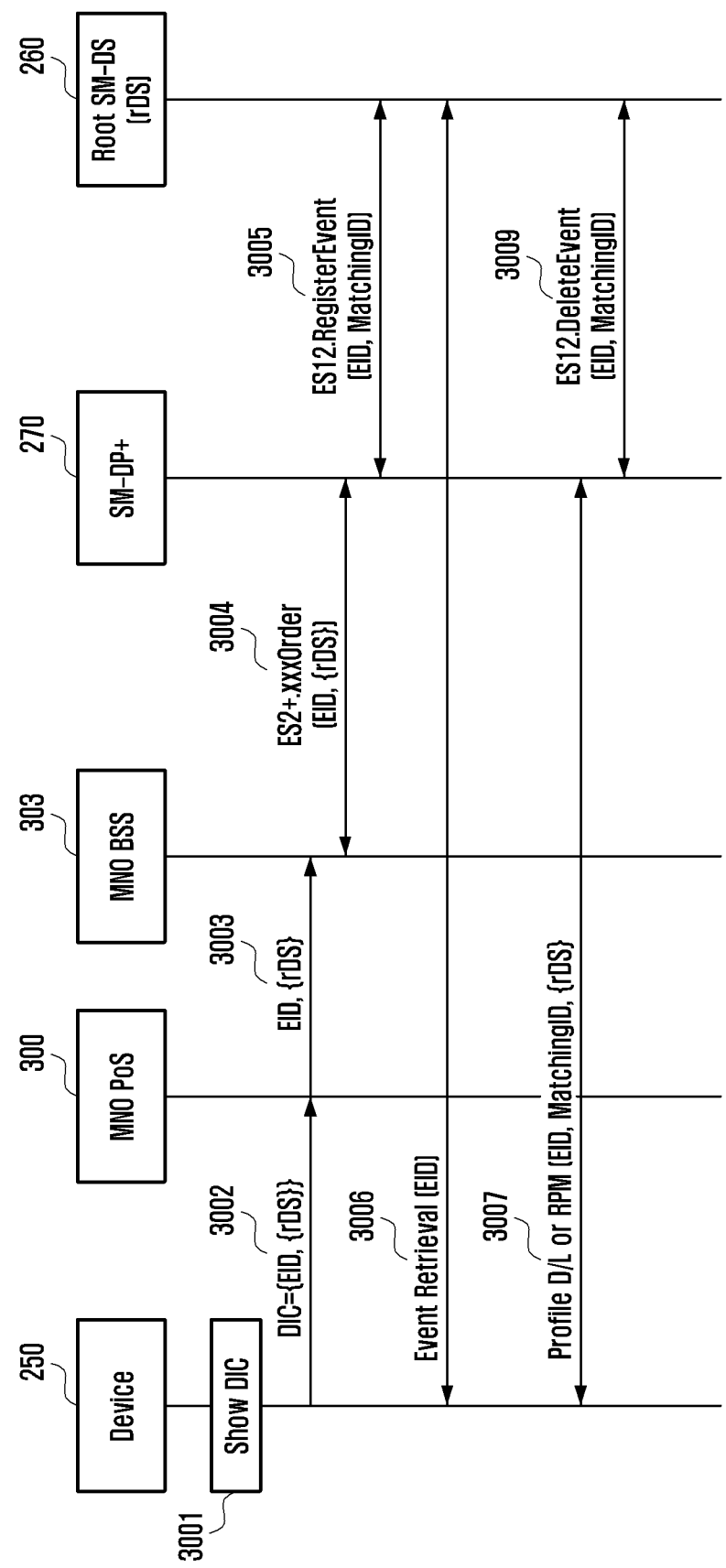
FIG. 3 is a diagram illustrating a message exchange procedure when an opening mediation server operates in connection with at least one profile providing server according to an embodiment of the disclosure.

FIG. 3 is a diagram illustrating a message exchange procedure when an opening mediation server operates in connection with at least one profile providing server according to an embodiment of the disclosure.

Referring to FIG. 3, in operation 3001, the UE 250 may display a device information code (DIC) including the eUICC ID (EID) of the eUICC in the UE 250 and information of at least one or more opening mediation servers that the UE can access, on the display of the UE. The DIC may be in the form of a user-readable string or QR code. The opening mediation server provided by the UE 250 may be a root opening mediation server, and the information of the opening mediation server may include at least one of the following information.

FQDN of opening mediation server

Unique object identifier (Object ID or OID) of opening mediation server

IP address of opening mediation server

In operation 3002, the UE 250 may provide the DIC to an operator point of sales (PoS) 300. As an input method through the operator PoS 300, various methods, such as QR code scanning and user input may be used. The operator PoS 300 may obtain the eUICC ID (EID) of the eUICC in the UE 250 and information of at least one or more root opening mediation servers that the UE can access, from the provided DIC.

In operation 3003, the operator PoS 300 may transmit the eUICC ID (EID) of the eUICC in the UE 250 and the information of at least one or more root opening mediation servers that the UE can access, to the operator server 303. As a method for the operator server 303 to obtain the eUICC ID (EID) of the eUICC in the UE 250 and the information of at least one or more root opening mediation servers that the UE can access, it should be noted that a method other than the above operations 3001, 3002, and 3003 may be used. For example, by using the eUICC ID, a request to a third server may be made to obtain information of the root opening mediation server supported by the UE. In addition, the operator may already have the information of the root opening mediation server corresponding to the eUICC ID.

In operation 3004, the operator server 303 may request the generation of an event from the first profile providing server 270. In this case, in the event generation request, the operator server 303 may include at least one of the eUICC ID (EID) of the eUICC in the UE 250 and the information of the opening mediation server supported by the UE. There may be at least one or more pieces of information of the opening mediation server. For example, the event generation request of operation 3004 may include transmitting, by the operator server 303, an event generation request message including at least one of the eUICC ID (EID) of the eUICC in the UE 250 and a root SM-DS address of the first root opening mediation server 260 in which the event generation is to be registered, to the first profile providing server 270, and replying, by the first profile providing server 270, with an event generation response message to notify the operator server 303 of the event generation result. For the convenience of drawing, operation 3004 of FIG. 3 is expressed as using only the eUICC identifier (EID) and the address of the first root opening mediation server 260. However, it should be noted that the generation of the event includes an exchange of the event generation request message and an event generation response message as described above, wherein the event generation request message may include at least one or more of the above-described factors (i.e., the eUICC ID and at least one or more opening mediation server addresses). Obviously, these considerations are equally applied to the drawings to be described later.

In operation 3005, the first profile providing server 270 may register the generated event in the first root opening mediation server 260. For example, the event registration of operation 3005 may include transmitting, by the first profile providing server 270, an event registration request message (Register Event Request) including at least one or more of an event ID (MatchingID), the eUICC ID (EID) of the eUICC in the UE 250, the addresses (SM-DP+ address) of at least one or more profile providing servers 270, and a forwarding indicator configured to be "False", to the first root opening mediation server 260, and replying, by the first root opening mediation server 260, with an event registration response message (Register Event Response) to notify the first profile providing server 270 of the event registration result. For the convenience of drawing, operation 3005 of FIG. 3 is expressed as using only the eUICC identifier (EID) and the event identifier (MatchingID). However, it should be noted that the registration of the event includes an exchange of the event registration request message (Register Event Request) and the event registration response message (Register Event Response) as described above, wherein the event registration request message (Register Event Request) may include at least one or more of the above-described factors (i.e., the event ID, the eUICC ID, and the profile providing server address, and the forwarding indicator). In addition, it should be noted that the forwarding indicator may be omitted, and in this case, the first root opening mediation server 260 may assume "False" as a default value of the forwarding indicator. Obviously, these considerations are equally applied to the drawings to be described later.

In operation 3006, the UE 250 may transmit a message requesting an event to the first root opening mediation server 260. For example, the event request of operation 3006 may use a UE authentication request message (Authenticate Client Request) including the eUICC ID (EID) of the eUICC in the UE 250. The first root opening mediation server 260 that has received the event request message in operation 3006 may reply to the UE 250 with an event list. For example, the event list may include a list of events registered using the eUICC in the UE 250 as a target so far. In addition, the event list may include event-related information. For example, the event-related information may include at least one of the address of the first profile providing server 270 and the event identifier (MatchingID). For example, the response of the event list in operation 3006 may use the UE authentication response message (Authenticate Client Response).

Next, in operation 3007, the UE 250 may transmit a message requesting an event from the first profile providing server 270. For example, the event request of operation 3007 may use the UE authentication request message (Authenticate Client Request) including at least one or more of the eUICC ID (EID) of the eUICC in the UE 250, the event ID (MatchingID) received in operation 3007, and information of the first root opening mediation server 260 that has received the event. In operation 3007, the UE 250 and the first profile providing server 270 may perform an RSP operation (profile installation or remote management) corresponding to the event ID (MatchingID). For example, operation 3007 may further include one or more message exchanges between the UE 250 and the first profile providing server 270, and a first message that the first profile providing server 270 replies to the UE 250 may be the UE authentication response message (Authenticate Client Response).

In addition, it may be determined that the event ID (MatchingID) provided by the UE 250 to the first profile providing server 270 is unrecognizable and is an event ID that can be processed. In this case, the first profile providing server 270 may notify the UE 250 of a message indicating that the event ID received in operation 3007 is unrecognizable. For example, the message may be the UE authentication response message (Authenticate Client Response) including the cause of an error. In addition, the cause of the error included in the message may be a string or a number string expressing "Event ID Refused (MatchingID Refused) ".

Since it is determined that the processing of the event has been completed or the event ID (MatchingID) is unrecognizable in operation 3007, the first profile providing server 270 may request deletion of the event from the first root opening mediation server 260 in operation 3009. At this time, the first profile providing server 270 may request the deletion of the event from the first root opening mediation server 260 by using the information (i.e., FQDN or IP address) of the first root opening mediation server 260 that the UE has received the event provided in operation 3007. For example, operation 3009 may include transmitting, by the first profile providing server 270, an event deletion request message (Delete Event Request) including at least one or more of the eUICC ID (EID) of the eUICC in the UE 250 and the event ID (MatchingID) to the first root opening mediation server 260, and replying, by the first root opening mediation server 260, with the event deletion response message (Delete Event Response) to notify the first profile providing server 270 of the event deletion result.

Figure 4:
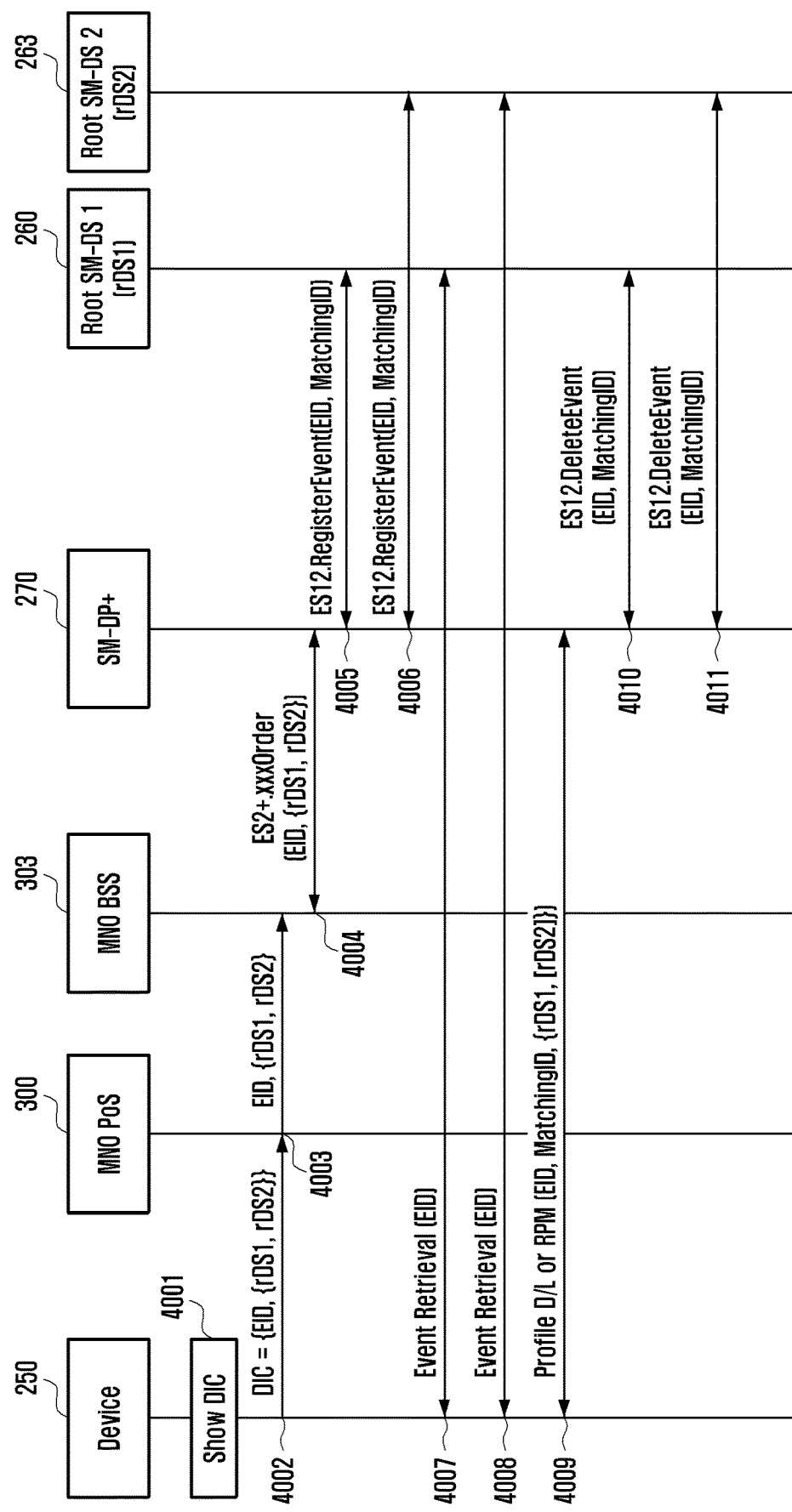
FIG. 4 is a diagram illustrating a message exchange procedure when a profile providing server operates in connection with at least one or more opening mediation servers according to an embodiment of the disclosure.

FIG. 4 is a diagram illustrating a message exchange procedure when a profile providing server operates in connection with at least one or more opening mediation servers according to an embodiment of the disclosure.

Referring to FIG. 4, the UE 250 may display a device information code (DIC) including the eUICC ID (EID) of the eUICC in the UE 250 and information of at least one opening mediation server that the UE can access, on the display of the UE. The DIC may be in the form of a user-readable string or QR code. The opening mediation server provided by the UE 250 may be a root opening mediation server, and the information of the opening mediation server may include at least one of the following information.

FQDN of opening mediation server
Unique object identifier (Object ID or OID) of opening mediation server
IP address of opening mediation server In operation 4002, the UE 250 may provide the DIC to the operator PoS 300. As an input method through the operator PoS 300, various methods, such as QR code scanning and user input may be used. The operator PoS 300 may obtain the eUICC ID (EID) of the eUICC in the UE 250 and information of at least one or more root opening mediation servers that the UE can access, from the provided DIC.

In operation 4003, the operator PoS 300 may transmit the eUICC ID (EID) of the eUICC in the UE 250 and the information of at least one or more root opening mediation servers that the UE can access, to the operator server 303. As a method for the operator server 303 to obtain the eUICC ID (EID) of the eUICC in the UE 250 and the information of at least one or more root opening mediation servers that the UE can access, it should be noted that a method other than the above operations 4001, 4002, and 4003 may be used. For example, by using the eUICC ID, a request to a third server may be made to obtain information of the root opening mediation server supported by the UE. In addition, the operator may already have the information of at least one or more root opening mediation server corresponding to the eUICC ID.

In operation 4004, the operator server 303 may request the generation of an event from the first profile providing server 270. In this case, in the event generation request, the operator server 303 may include at least one of the eUICC ID (EID) of the eUICC in the UE 250, the information of the opening mediation server supported by the UE. When there is at least one or more pieces of information of the opening mediation server supported by the UE 250, which is obtained by the operator server 303, the operator server 303 may selectively include some or all of the corresponding information in the event generation request. There may be at least one or more pieces of information of the opening mediation server included in the request. For example, the event generation request of operation 4004 may include transmitting, by the operator server 303, an event generation request message including at least one of the eUICC ID (EID) of the eUICC in the UE 250 and a root SM-DS address of the first root opening mediation server 260 in which the event generation is to be registered, to the first profile providing server 270, and replying, by the first profile providing server 270, with an event generation response message to notify the operator server 303 of the event generation result. For the convenience of drawing, operation 4004 of FIG. 4 is expressed as using only the eUICC identifier (EID) and the address of the first root opening mediation server 260. However, it should be noted that the generation of the event includes an exchange of the event generation request message and the event generation response message as described above, wherein the event generation request message may include at least one or more of the above-described factors (i.e., the eUICC ID and at least one or more opening mediation server addresses). Obviously, these considerations are equally applied to the drawings to be described later.

When the operator server 303 includes the information of the at least one or more opening mediation servers in the event generation request message in operation 4004, the first profile providing server 270 may perform an operation of registering the generated event in the opening mediation server.

In operation 4005, the first profile providing server 270 may register the generated event in the first root opening mediation server 260 by using first opening mediation server information included in the event generation request message in operation 4004. For example, the event registration of operation 4005 may include transmitting, by the first profile providing server 270, an event registration request message (Register Event Request) including at least one or more of an event ID (MatchingID), the eUICC ID (EID) of the eUICC in the UE 250, the addresses (SM-DP+ address) of at least one or more profile providing servers 270, and a forwarding indicator configured to be "False", to the first root opening mediation server 260, and replying, by the first root opening mediation server 260, with an event registration response message (Register Event Response) to notify the first profile providing server 270 of the event registration result. For the convenience of drawing, operation 4005 of FIG. 4 is expressed as using only the eUICC ID (EID) and the event identifier (MatchingID). However, it should be noted that the registration of the event includes an exchange of the event registration request message (Register Event Request) and the event registration response message (Register Event Response) as described above, wherein the event registration request message (Register Event Request) may include at least one or more of the above-described factors (i.e., the event ID, the eUICC ID, and the profile providing server address, and the forwarding indicator). In addition, it should be noted that the forwarding indicator may be omitted, and in this case, the first root opening mediation server 260 may assume "False" as a default value of the forwarding indicator. Obviously, these considerations are equally applied to the drawings to be described later.

In operation 4006, the first profile providing server 270 may register the generated event in a second root opening mediation server 263 by using second root opening mediation server information included in the event generation request message in operation 4004. For example, the event request of operation 4006 may include transmitting, by the first profile providing server 270, the event registration request message (Register Event Request) including at least one or more of the event ID (MatchingID), the eUICC ID (EID) of the eUICC in the UE 250, the addresses (SM-DP+ address) of at least one or more profile providing servers 270, and the forwarding indicator configured to be "False", to the second root opening mediation server 263, and replying, by the first root opening mediation server 260, with the event registration response message (Register Event Response) to notify the first profile providing server 270 of the event registration result. For the convenience of drawing, operation 4006 of FIG. 4 is expressed as using only the eUICC identifier (EID) and the event identifier (MatchingID). However, it should be noted that the registration of the event includes an exchange of the event registration request message (Register Event Request) and the event registration response message (Register Event Response) as described above, wherein the event registration request message (Register Event Request) may include at least one or more of the above-described factors (i.e., the event ID, the eUICC ID, and the profile providing server address, and the forwarding indicator). In addition, it should be noted that the forwarding indicator may be omitted, and in this case, the second root opening mediation server 263 may assume "False" as a default value of the forwarding indicator. Obviously, these considerations are equally applied to the drawings to be described later.

In operation 4007, the UE 250 may transmit a message requesting an event to the first root opening mediation server 260. For example, the event request of operation 4007 may use a UE authentication request message (Authenticate Client Request) including the eUICC ID (EID) of the eUICC in the UE 250. The first root opening mediation server 260 that has received the event request message in operation 4007 may reply to the UE 250 with an event list. For example, the event list may include a list of events registered using the eUICC in the UE 250 as a target so far. In addition, the event list may include event-related information. For example, the event-related information may include at least one of the address of the first profile providing server 270 and the event identifier (MatchingID). For example, the response of the event list in operation 4007 may use the UE authentication response message (Authenticate Client Response).

In operation 4008, the UE 250 may request the event from the second root opening mediation server 263 and may receive the event list. When the same event-related information from the event list which is previously received and is not processed, that is, event-related information including the address of the same profile providing server and the event identifier already exists, the UE 250 may discard duplicate events.

Next, in operation 4009, the UE 250 may transmit a message requesting an event to the first profile providing server 270. For example, the event request of operation 4009 may use a UE authentication request message (Authenticate Client Request) including at least one or more of the eUICC ID (EID) of the eUICC in the UE 250, the event ID (MatchingID) received in operation 4007 or operation 4008, the information of the first root opening mediation server 260 having received the event, and information of the second root opening mediation server 263 having received the duplicate events. In operation 4009, the UE 250 and the first profile providing server 270 may perform an RSP operation (profile installation or remote management) corresponding to the event ID (MatchingID). For example, operation 4009 may further include one or more message exchanges between the UE 250 and the first profile providing server 270, and a first message that the first profile providing server 270 replies to the UE 250 may be the UE authentication response message (Authenticate Client Response).

In addition, in operation 4009, it may be determined that the event ID (MatchingID) provided by the UE 250 to the first profile providing server 270 is unrecognizable and is an event ID that can be processed. In this case, the first profile providing server 270 may notify the UE 250 of a message indicating that the event ID received in operation 4009 is unrecognizable. For example, the message may be the UE authentication response message (Authenticate Client Response) including the cause of an error. In addition, the cause of the error included in the message may be a string or a number string expressing "Event ID Refused (MatchingID Refused)".

Since it is determined that the processing of the event has been completed or the event ID (MatchingID) is unrecognizable in operation 4009, the first profile providing server 270 may request deletion of the event from the first root opening mediation server 260 in operation 4010. At this time, the first profile providing server 270 may request the deletion of the event from the first root opening mediation server 260 by using the information (i.e., FQDN or IP address) of the first root opening mediation server 260 that the UE has received the event provided in operation 4007 to operation 4008. For example, operation 4010 may include transmitting, by the first profile providing server 270, an event deletion request message (Delete Event Request) including at least one or more of the eUICC ID (EID) of the eUICC in the UE 250 and the event ID (MatchingID) to the first root opening mediation server 260 indicated by the information of the opening mediation server that has received the event received in operation 4009, and replying, by the first root opening mediation server 260, with the event deletion response message (Delete Event Response) to notify the first profile providing server 270 of the event deletion result.

In operation 4011, when it is recognized in operation 4011 that the same event other than the first root opening mediation server 260 has been registered in the second root opening mediation server 263, the first profile providing server 270 may request the deletion of the event from the second root opening mediation server 263. For example, the first profile providing server 270 may confirm a list of the opening mediation servers in which the event is registered with the event ID (MatchingID). As another example, the first profile providing server 270 may confirm a list of other opening mediation servers in which the event is registered based on the information of the second root opening mediation server 263 that has received the duplicate event provided by the UE 250 in operation 4009. For example, operation 4011 may include transmitting, by the first profile providing server 270, an event deletion request message (Delete Event Request) including at least one or more of the eUICC ID (EID) of the eUICC in the UE 250 and the event ID (MatchingID) to the second root opening mediation server 263, and replying, by the second root opening mediation server 263, with an event deletion response message (Delete Event Response) to notify the first profile providing server 270 of the event deletion result.

Figure 5:
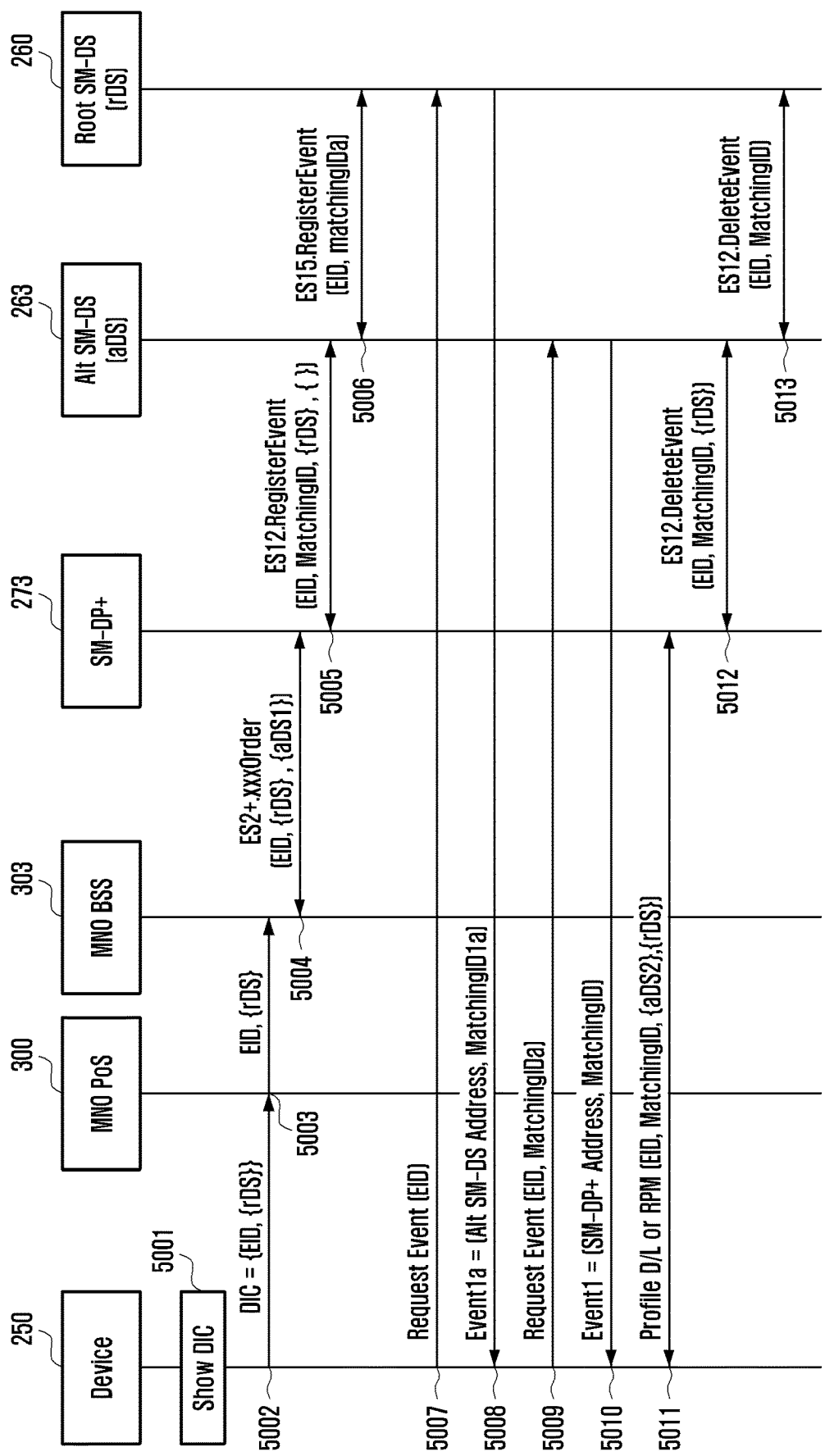
FIG. 5 is a diagram illustrating a message exchange procedure when a UE operates in connection with at least one root opening mediation server and a profile providing server operates in connection with at least one or more alternative opening mediation servers according to an embodiment of the disclosure.

FIG. 5 is a diagram illustrating a message exchange procedure when a UE operates in connection with at least one root opening mediation server and a profile providing server operates in connection with at least one or more alternative opening mediation servers according to an embodiment of the disclosure.

Referring to FIG. 5, the UE 250 may display a device information code (DIC) including the eUICC ID (EID) of the eUICC in the UE 250 and information of at least one or more opening mediation servers that the UE can access, on the display of the UE. The DIC may be in the form of a user-readable string or QR code. The opening mediation server provided by the UE 250 may be a root opening mediation server, and the information of the opening mediation server may include at least one of the following information.

FQDN of opening mediation server

Unique object identifier (Object ID or OID) of opening mediation server

IP address of opening mediation server

In operation 5002, the UE 250 may provide the DIC to the operator PoS 300. As an input method through the operator PoS 300, various methods, such as QR code scanning and user input may be used. The operator PoS 300 may obtain the eUICC ID (EID) of the eUICC in the UE 250 and information of at least one or more root opening mediation servers that the UE can access, from the provided DIC.

In operation 5003, the operator PoS 300 may transmit the eUICC ID (EID) of the eUICC in the UE 250 and the information of at least one or more root opening mediation servers that the UE can access, to the operator server 303. As a method for the operator server 303 to obtain the eUICC ID (EID) of the eUICC in the UE 250 and the information of at least one or more root opening mediation servers that the UE can access, it should be noted that a method other than the above operations 5001, 5002, and 5003 may be used. For example, by using the eUICC ID, a request to a third server may be made to obtain information of the root opening mediation server supported by the UE. In addition, the operator may already have the information of at least one or more root opening mediation server corresponding to the eUICC ID.

In operation 5004, the operator server 303 may request the generation of an event from the second profile providing server 273. In this case, in the event generation request, the operator server 303 may include at least one of the eUICC ID (EID) of the eUICC in the UE 250, the information of the opening mediation server supported by the UE, and information of alternative opening mediation server in which the second profile providing server 273 should register the event. When there is at least one or more pieces of information of the opening mediation server supported by the UE 250, which is obtained by the operator server 303, the operator server 303 may selectively include some or all of the corresponding information in the event generation request. There may be at least one or more pieces of information of the opening mediation server included in the request. There may be at least one or more pieces of information of the alternative opening mediation server included in the request.

For example, the event generation request of operation 5004 may include transmitting, by the operator server 303, an event generation request message including at least one of the eUICC ID (EID) of the eUICC in the UE 250, a root SM-DS address of the root opening mediation server 260 in which the event generation is to be registered, and the alternative opening mediation server 263 to the second profile providing server 273, and replying, by the second profile providing server 273, with an event generation response message to notify the operator server 303 of the event generation result. For the convenience of drawing, operation 5004 of FIG. 5 is expressed as using only the eUICC identifier (EID), the address of the root opening mediation server 260, and the address of the alternative opening mediation server 263. However, it should be noted that the generation of the event includes an exchange of the event generation request message and the event generation response message as described above, wherein the event generation request message may include at least one or more of the above-described factors (i.e., the eUICC ID and at least one or more opening mediation server addresses). Obviously, these considerations are equally applied to the drawings to be described later.

When the operator server 303 includes the information of the at least one or more alternative opening mediation servers in the event generation request message in operation 5004, the first profile providing server 270 may perform an operation of registering the generated event in the alternative opening mediation server 263.

In operation 5005, the first profile providing server 270 may register a generated first event in the alternative opening mediation server 263 by using the alternative opening mediation server information included in the event generation request message in operation 5004. For example, the event registration of operation 5005 may include transmitting, by the first profile providing server 270, an event registration request message (Register Event Request) including at least one or more of a first event ID (MatchingID), the eUICC ID (EID) of the eUICC in the UE 250, the addresses (SM-DP+ address) of at least one or more profile providing servers 273, the address of the root opening mediation server (Root SM-DS address), and a forwarding indicator configured to be "True", to the alternative opening mediation server 263, and replying, by the alternative opening mediation server 263, with an event registration response message (Register Event Response) to notify the second profile providing server 273 of the event registration result. For the convenience of drawing, operation 5005 of FIG. 5 is expressed as using only the eUICC ID (EID), the first event identifier (MatchingID), and the address of the root opening mediation server. However, it should be noted that the registration of the event includes an exchange of the event registration request message (Register Event Request) and the event registration response message (Register Event Response) as described above, wherein the event registration request message (Register Event Request) may include at least one or more of the above-described factors (i.e., the event ID, the eUICC ID, and the profile providing server address, the root opening mediation server address, and the forwarding indicator). In addition, it should be noted that the forwarding indicator may be omitted, and in this case, the root opening mediation server 260 may assume "False" as a default value of the forwarding indicator. Obviously, these considerations are equally applied to the drawings to be described later.

In operation 5006, the alternative opening mediation server 263 may re-register the first event in the root opening mediation server 260 according to the forwarding indicator configured to be "True" of operation 5005 or the address of the root opening mediation server 260. Alternatively, when the information of the alternative opening mediation server in which the event is to be re-registered does not exist in operation 5005 and the information of the root opening mediation server 250 in which the event is to be re-registered exists, the first event may be re-registered in the root opening mediation server 260. For example, the re-registration of the first event of operation 5006 may include transmitting, by the alternative opening mediation server 263, an event registration request message (Register Event Request) including at least one or more of the modulated first event ID (MatchingIDa), the eUICC ID (EID) of the eUICC in the UE 250, the address of the alternative opening mediation server 263, and the forwarding indicator configured to be "False" to the root opening mediation server 260, and replying, by the root opening mediation server 260, with an event registration response message (Register Event Response) to notify the alternative opening mediation server 263 of the event registration result. For example, the modulated first event ID (MatchingIDa) may be the same value as the first event ID (MatchingID).

In operation 5007, the UE 250 may transmit a message requesting an event to the root opening mediation server 260. For example, the event request of operation 5007 may use a UE authentication request message (Authenticate Client Request) including the eUICC ID (EID) of the eUICC in the UE 250.

In operation 5008, the root opening mediation server 260 may reply to the UE 250 with an event list. For example, the event list may include a list of events registered using the eUICC in the UE 250 as a target so far. In addition, the event list may include event-related information.

Referring to FIG. 5, an example of replying with the first event-related information re-registered in operation 5006 will be described. For example, the re-registered first event-related information included in the event list may include at least one or more of the address of the alternative opening mediation server 263 and the modulated first event ID (MatchingIDa).

In addition, the reply of the event list in operation 5008 may use a UE authentication response message (Authenticate Client Response).

For example, the listing order of events in the event list may follow the time sequence in which each event is registered in the root opening mediation server 260.

In operation 5009, the UE 250 may transmit a message requesting the re-registered first event to the alternative opening mediation server 263. For example, the event request of operation 5009 may use the UE authentication request message (Authenticate Client Request) including at least one or more of the eUICC ID of the eUICC in the UE 250 and the modulated first event ID (MatchingIDa) received in operation 5008.

In operation 5010, the alternative opening mediation server 263 may reply to the UE 250 with the event list. For example, the event list may include a list of events registered using the eUICC in the UE 250 as a target so far. In addition, the event list may include event-related information.

In FIG. 5, an example of replying with the registered first event related information in operation 5005 will be described. For example, the first event related information included in the event list may include at least one of the address of the second profile providing server 273 and the first event ID (MatchingID). In addition, the reply of the event list in operation 5010 may use a UE authentication response message (Authenticate Client Response).

Next, in operation 5011, the UE 250 may transmit a message requesting an event to the second profile providing server 273. For example, the event request of operation 5011 may use the UE authentication request message (Authenticate Client Request) including at least one or more of the eUICC ID (EID) of the eUICC in the UE 250, the first event ID (MatchingID) received in operation 5010, the information of the alternative opening mediation server 263 having received the first event, and information of the root opening mediation server 260 having received the re-registered first event. At this time, the information of the opening mediation server included at this time may be included in the order of access or the reverse order of the order until the first event is received. In operation 5011, the UE 250 and the second profile providing server 273 may perform an RSP operation (profile installation or remote management) corresponding to the event ID (MatchingID). For example, operation 5011 may further include one or more message exchanges between the UE 250 and the second profile providing server 273, and a first message that the second profile providing server 273 replies to the UE 250 may be the UE authentication response message (Authenticate Client Response).

In addition, in operation 5011, it may be determined that a first event ID (MatchingID) provided by the UE 250 to the second profile providing server 273 is unrecognizable and is an event ID that can be processed. In this case, the second profile providing server 273 may notify the UE 250 of a message indicating that the event ID received in operation 5011 is unrecognizable. For example, the message may be the UE authentication response message (Authenticate Client Response) including the cause of an error. In addition, the cause of the error included in the message may be a string or a number string expressing "Event ID Refused (MatchingID Refused)".

Since it is determined that the processing of the event has been completed or the event ID (MatchingID) is unrecognizable in operation 5011, the second profile providing server 273 may request deletion of the event from the alternative opening mediation server 263 in which the corresponding event has been registered in operation 5012. At this time, the second profile providing server 273 may request the deletion of the event from the alternative opening mediation server 263 by using the information (i.e., FQDN or IP address) of the alternative opening mediation server 263 that the UE has received the event provided in operation 5010. In addition, the deletion request may include the information (i.e., FQDN or IP address) of the root opening mediation server 260 that has received the re-registered first event provided by the UE 250 in operation 5010. For example, operation 5012 may include transmitting, by the second profile providing server 273, an event deletion request message (Delete Event Request) including at least one or more of the eUICC ID (EID) of the eUICC in the UE 250, the event ID (MatchingID), and information of the root opening mediation server 260 having received the re-registered first event to the alternative opening mediation server 263 indicated by the information of the opening mediation server that has received the first event received in operation 5010, and replying, by the root opening mediation server 260, with an event deletion response message (Delete Event Response) to notify the first profile providing server 270 of the event deletion result.

In operation 5013, since the processing of the first event has been completed, the alternative opening mediation server 263 may request the deletion of the re-registered first event from the root opening mediation server 260. The alternative opening mediation server 263 may recognize the opening mediation server in which the re-registered first event to be deleted is registered using the information of the root opening mediation server 260 that has received the re-registered first event transmitted in operation 5012. For example, operation 5013 may include transmitting, by the alternative opening mediation server 263, the event deletion request message (Delete Event Request) including at least one or more of the eUICC ID (EID) of the eUICC in the UE 250 and the modulated first event ID (MatchingIDa), and replying with the event deletion response message (Delete Event Response) to notify the alternative opening mediation server 263 of the event deletion result.

Meanwhile, FIG. 5 shows a case in which the two opening mediation servers 263 and 260 are used for re-registration of the event, it should be noted that three or more opening mediation servers can be used. For example, in the event registration process, the opening mediation server 263 may re-register the event in another root opening mediation server (not shown). At this time, the alternative opening mediation server 263 may determine a root opening mediation server (not shown) to re-register the event by using the information of one or more alternative opening mediation servers included in the event registration request message of the previous operation. When the event registration request message includes another alternative opening mediation server (not shown) to re-register the event, the root opening mediation server (not shown) in which the event is re-registered may re-register the re-registered event in the corresponding opening mediation server. In addition, when the information of the alternative opening mediation server to re-register the event does not exist in the event registration message of the root opening mediation server and the information of the root opening mediation server to re-register the event exists in the event registration message of the root opening mediation server, the alternative opening mediation server (not shown) may re-register the event in the corresponding root opening mediation server 260.

In addition, the example of FIG. 5 is applied in combination with the example of FIG. 4 described above. It is obvious that the event generated by the profile providing server is registered in the alternate opening mediation server, and then the alternate opening mediation server is re-registered twice or more in two or more root opening mediation servers, so that the re-registration may be notified to the UE through the root opening mediation server and the alternative opening mediation server.

Figure 6:
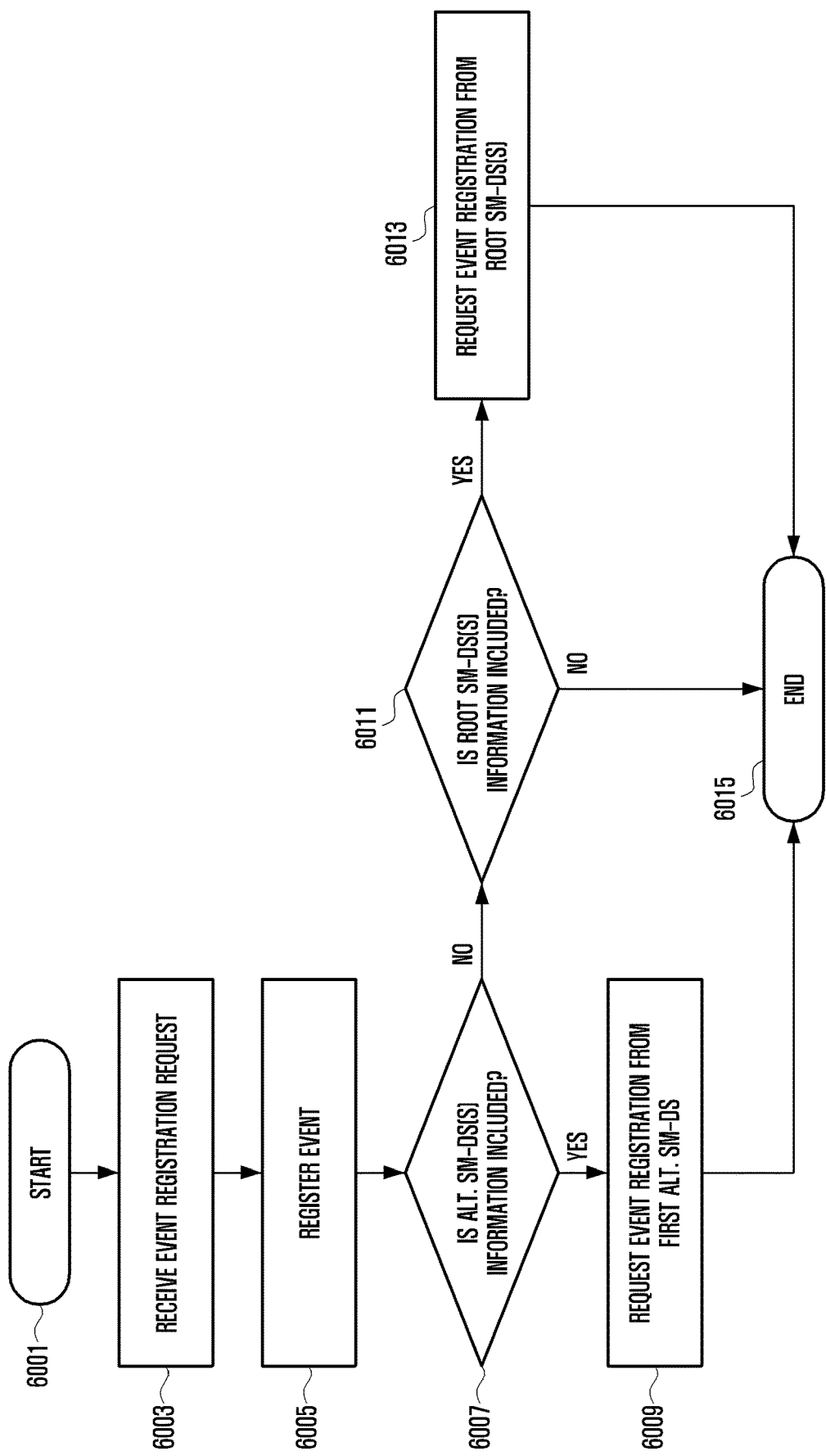
FIG. 6 is a flowchart illustrating a procedure for registering an event by a profile providing server or an opening mediation server, that is, an RSP server (SM-XX), and requesting event registration from another opening mediation server according to an embodiment of the disclosure.

FIG. 6 is a flowchart illustrating a procedure for registering an event by a profile providing server or an opening mediation server, that is, an RSP server (SM-XX), and requesting event registration from another opening mediation server according to an embodiment of the disclosure.

Referring to FIG. 6, in operation 6001, an RSP server may start to operate.

In operation 6003, the RSP server may receive an event registration request. When the RSP server is a profile providing server, the corresponding request may be transmitted from an operator server. When the RSP server is an opening mediation server, the corresponding request may be transmitted from another opening mediation server or profile providing server.

In operation 6005, the RSP server may generate or register the requested event. When the RSP server is the profile providing server, the RSP server may generate an event and generate an event ID (MatchingID). When the RSP server is the opening mediation server, the RSP server may include at least one of the event ID (MatchingID) included in a request message and the eUICC ID of the UE to register the event.

In operation 6007, the RSP server may determine whether an information list of at least one or more alternative opening mediation servers exists in an event registration request message. For example, when the information list of the alternative opening mediation server exists, the RSP server may proceed to operation 6009. In addition, when the information list of the alternative opening mediation server does not exist, the RSP server may proceed to operation 6011.

In operation 6009, the RSP server may request the event registration from a specific opening mediation server within the information list of the alternative opening mediation server. When the RSP server is the profile providing server, the event registration request message may include at least one of an event ID (MatchingID) generated in operation 6005 and its own address (that is, profile providing server address), the information list of the alternative opening mediation server to re-register the event, and an information list of a root opening mediation server to re-register the event. The information list of the alternative opening mediation server to re-register the event may not include the information of the opening mediation server requesting to re-register the current event.

In addition, in operation 6009, when the RSP server is the opening mediation server, the RSP server may generate a modulated event ID (MatchingIDa) and may store the generated event ID in connection with the event registered in operation 6005. Next, the RSP server may include at least one of the modulated event ID (MatchingIDa), its own address (that is, the address of the opening mediation server), the information list of the alternative opening mediation server to re-register the event, and the information list of the root opening mediation server to re-register the event to request to register the event. The information list of the alternative opening mediation server to re-register the event may not include information of the opening mediation server requesting to re-register the current event. In operation 6011, the RSP server may determine whether the information list of at least one or more root opening mediation servers exists in an event registration request message. For example, when the information list of the root opening mediation server exists, the RSP server may proceed to operation 6013. In addition, when the information list of the alternative opening mediation server does not exist, the RSP server may proceed to operation 6015 to complete the event registration and wait for another operation.

In operation 6013, the RSP server may request event registration from all the opening mediation servers in the information list of the root opening mediation server. When the RSP server is the profile providing server, the event registration request message may include one of the event ID (MatchingID) generated in operation 6005 and its own address (i.e., the profile providing server address). In addition, when the RSP server is the opening mediation server in operation 6013, the RSP server may generate a modified event ID (MatchingIDa) and store the generated event ID in connection with the event registered in operation 6005. Next, the RSP server may request event registration while including at least one of the modified event ID (MatchingIDa) and its own address (i.e., the address of the open mediation server).

Figure 7:
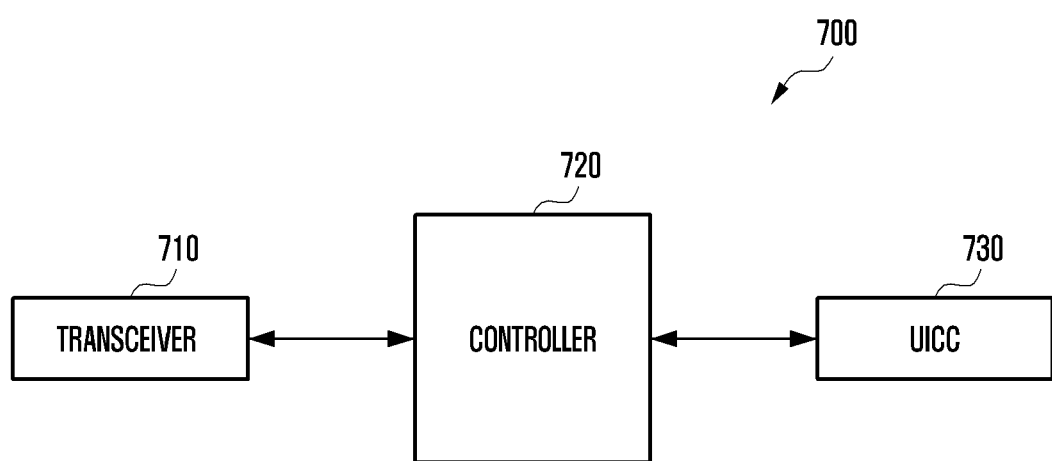
FIG. 7 is a diagram illustrating components of a UE according to an embodiment of the disclosure.

FIG. 7 is a diagram illustrating the components of a UE 250 according to an embodiment of the disclosure.

Referring to FIG. 7, the UE 700 may include a transceiver 710 and at least one processor 720. In addition, the UE 700 may include a UICC 730. For example, the UICC 730 may be inserted into the UE 700 or may be an eUICC embedded in the UE 700.

The transceiver 710 according to various embodiments may transmit and receive signals, information, data, or the like, according to various embodiments of the disclosure with a profile providing server 800 or an opening mediation server 900.

For example, the transceiver 710 according to various embodiments may transmit a first message requesting an event to the opening mediation server 900.

The transceiver 710 according to various embodiments may receive event-related information from the opening mediation server 800 in response to the first message.

The transceiver 710 according to various embodiments may transmit a second message requesting an event to the profile providing server 800 based on the event-related information.

For example, the opening mediation server 900 according to various embodiments may include a root opening mediation server and a alternative opening mediation server.

The transceiver 710 according to various embodiments may transmit a third message requesting an event to the second opening mediation server based on second event-related information received from the first opening mediation server.

The transceiver 710 according to various embodiments may receive first event-related information from the second opening mediation server in response to the third message.

The transceiver 710 according to various embodiments may transmit the second message requesting an event to the profile providing server 800 based on the first event-related information.

For example, the second message according to various embodiments may further include at least one of information related to an acquisition path of the first event-related information and information related to the second opening mediation server that has replied with the first event-related information.

In addition, the third message according to various embodiments may further include at least one of information related to an acquisition path of the second event-related information and the first opening mediation server that has replied with the second-event related information.

In addition, the transceiver 710 according to various embodiments may receive information related to event processing from the profile providing server 800 in response to the second message.

For example, the information related to the event processing received from the profile providing server 800 according to various embodiments may include information indicating an event processing failure.

The information related to the event processing received from the profile providing server 800 according to various embodiments may include information related to profile installation or remote management.

The controller 720 according to various embodiments may control the overall operation of the UE 700. The controller 720 may control the overall operation of the UE 700 according to various embodiments of the disclosure as described above.

For example, a controller 720 according to various embodiments may confirm an event processing exception list, and may determine whether to process the event based on the event-related information received from the opening mediation server 900 and the event processing exception list.

In addition, the controller 720 according to various embodiments may control the transceiver 710 to transmit the second message requesting the event to the profile providing server 800 based on the determining whether to process the event by controlling the transceiver 710 and the event-related information, may receive the information related to the event processing from the profile providing server 800 in response to the second message, and may update the event processing exception list based on the information related to the event processing. For example, when the information related to the event processing received from the profile providing server 800 includes information indicating an event processing failure, the at least one controller 720 according to various embodiments may add the event-related information to the event processing exception list.

The UICC 730 according to various embodiments may download a profile and may install the profile. In addition, the UICC 730 may manage the profile.

The UICC 730 may operate under the control of the controller 720. Alternatively, the UICC 730 may include a processor or a controller for installing a profile, or an application may be installed therein. A part of the application may be installed in the controller 720.

Meanwhile, the UE 700 may further include a memory (not shown), and may store data, such as a basic program, an application program, and configuration information for the operation of the UE 700. In addition, the memory may include at least one storage medium of a flash memory type, a hard disk type, a multimedia card micro type, a card type memory (e.g., SD or XD memory), a magnetic memory, a magnetic disk, an optical disk, a random access memory (RAM), a static random access memory (SRAM), a read-only memory (ROM), a programmable read-only memory (PROM), and an electrically erasable programmable read-only memory (EEPROM). In addition, the controller 720 may perform various operations using various programs, contents, data, or the like, stored in the memory.

Figure 8:
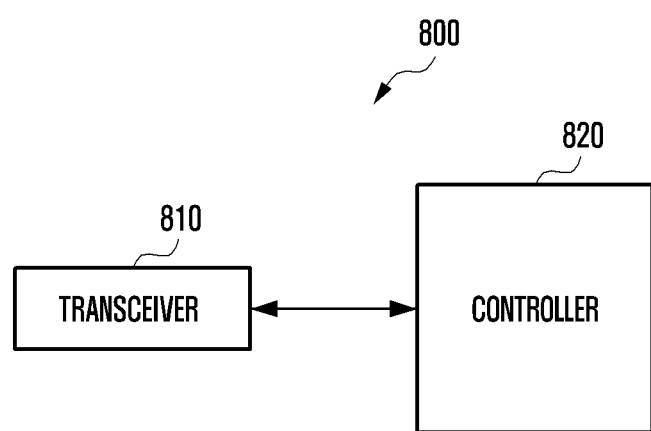
FIG. 8 is a diagram illustrating components of a profile providing server 800 according to an embodiment of the disclosure.

FIG. 8 is a diagram illustrating the components of a profile providing server 800 according to an embodiment of the disclosure.

Referring to FIG. 8, the profile providing server 800 according to various embodiments may include a transceiver 810 and at least one processor (or controller 820).

The transceiver 810 according to various embodiments may transmit and receive signals, information, data, and the like, according to various embodiments of the disclosure with the UE 700 or an opening mediation server 900. For example, the transceiver 810 may transmit information related to profile installation or remote management to the UE.

For example, the transceiver 810 according to various embodiments may receive an event request message from the UE 700.

For example, the event request message according to various embodiments may include event-related information, and the event-related information according to various embodiments may be based on information received by the UE 700 from the opening mediation server 900.

Meanwhile, a controller 820 is a component for generally controlling the profile providing server 800. The controller 820 may control the overall operation of the profile providing server 800 according to various embodiments of the disclosure as described above.

For example, the controller 820 according to various embodiments may determine the validity of the event-related information including the event request message received from the UE 700, and based on the validity determination of the event-related information, the transceiver 820 may be controlled to transmit information related to event processing to the UE.

For example, when the event-related information is valid, event processing-related information according to various embodiments may include information related to profile installation or remote management.

In addition, when the event-related information is invalid, the event-related information according to various embodiments may include information indicating an event processing failure.

The controller 820 according to various embodiments may control the transceiver 810 to transmit an event deletion request message to the opening mediation server when event processing is completed.

The event request message according to various embodiments of the disclosure may further include at least one of information related to an acquisition path of event-related information and information related to the opening mediation server 900.

The controller 820 according to various embodiments of the disclosure may transmit the event deletion request message to the opening mediation based on at least one piece of the information related to the acquisition path of the event-related information and the information related to the opening mediation server 900. The transceiver may be controlled to transmit to the server 900.

Meanwhile, the profile providing server 800 may further include a memory (not shown), and may store data, such as a basic program, an application program, and configuration information for the operation of the profile proving server 800. In addition, the memory may include at least one storage medium of a flash memory type, a hard disk type, a multimedia card micro type, a card type memory (e.g., SD or XD memory), a magnetic memory, a magnetic disk, an optical disk, a RAM, an SRAM, a ROM, a PROM, and an EEPROM. In addition, the controller 820 may perform various operations using various programs, contents, data, or the like, stored in the memory.

Figure 9:
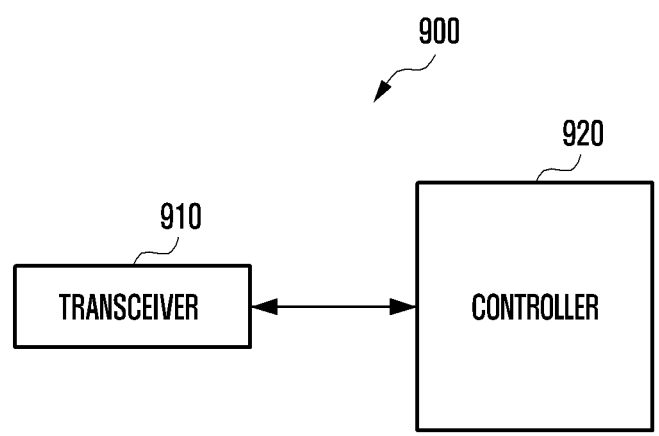
FIG. 9 is a diagram illustrating components of an opening mediation server 900 according to an embodiment of the disclosure.

FIG. 9 is a diagram illustrating the components of an opening mediation server 900 according to an embodiment of the disclosure.

Referring to FIG. 9, the opening mediation server 900 according to various embodiments may include a transceiver 910 and a controller 920.

The transceiver 910 according to various embodiments may transmit and receive signals, information, data, or the like, according to various embodiments of the disclosure with the UE 700 or the profile providing server 800. For example, the transceiver 910 may transmit event-related information to the UE. For example, the transceiver 910 according to various embodiments may receive an event request message from the UE.

For example, the event request message according to various embodiments may include event-related information, and the event-related information according to various embodiments may be based on information received by the UE 700 from another opening mediation server (not shown).

Meanwhile, the controller 920 is a component for generally controlling the opening mediation server 900. The controller 920 may control the overall operation of the opening mediation server 900 according to various embodiments of the disclosure as described above.

For example, the controller 920 according to various embodiments of the disclosure may include the transceiver 910 to receive an event registration request message from the profile providing server 800 or another opening mediation server (not shown) in order to register an event.

The controller 920 according to various embodiments may register the event in response to the event registration request message.

The registered event according to various embodiments may be related to an event generated by the profile providing server 800.

For example, when the transceiver 910 receives the event registration request message from the other open mediation server, the registered event may be an event obtained by modulating the event generated by the profile providing server.

The controller 920 according to various embodiments may control the transceiver 910 to receive an event deletion request message from the profile providing server 800, and based on the event deletion request message, the registered event may be deleted.

The event registration request message according to various embodiments may include information related to an event destruction time.

For example, the one or more controllers 920 according to various embodiments may delete the event, based on the information related to an event destruction time.

The event registration request message according to various embodiments may include information related to an event deletion notification.

For example, the controller 920 according to various embodiments may control the transceiver 910 to notify the profile providing server 800 of the event deletion based on the information related to the event deletion notification.

Meanwhile, the opening mediation server 900 may further include a memory (not shown), and may store data, such as a basic program, an application program, and configuration information for the operation of the opening mediation server 900. In addition, the memory may include at least one storage medium of a flash memory type, a hard disk type, a multimedia card micro type, a card type memory (e.g., SD or XD memory), a magnetic memory, a magnetic disk, an optical disk, a RAM, an SRAM, a ROM, a PROM, and an EEPROM. In addition, the controller 920 may perform various operations using various programs, contents, data, or the like, stored in the memory.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments of the disclosure, but should be defined by the appended claims and equivalents thereof.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via another element (e.g., a third element).

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment of the disclosure, the "module" may be implemented in the form of an application-specific integrated circuit (ASIC).

Various embodiments as set forth herein may be implemented as software (e.g., a program) including instructions that are stored in a storage medium (e.g., an internal memory or external memory) that is readable by a machine (e.g., a computer). The machine is a device that can invoke the stored instructions from the storage medium, and operate according to the invoked instructions, and may include terminals (e.g., the first terminal 230 or the second terminal 230) according to various embodiments. When the instructions are executed by a processor, the processor may perform functions corresponding to the instructions, with or without using one or more other components under the control of the processor. The instructions may include a code generated by a complier or a code executable by an interpreter.

The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each element (e.g., a module or a program) of the above-described elements may include a single entity or multiple entities. According to various embodiments of the disclosure, one or more of the above-described elements may be omitted, or one or more other elements may be added. Alternatively or additionally, a plurality of elements (e.g., modules or programs) may be integrated into a single element. In such a case, according to various embodiments of the disclosure, the integrated element may still perform one or more functions of each of the plurality of elements in the same or similar manner as they are performed by a corresponding one of the plurality of elements before the integration. According to various embodiments of the disclosure, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a server in a wireless communication system, the method comprising:
   receiving, from a mobile network operator, a first message including an embedded universal integrated circuit card (eUICC) identifier, first information on a first opening mediation server and second information on a second opening mediation server;
   generating an event based on the first message;
   registering the event in the first opening mediation server based on the first message;
   registering the event in the second opening mediation server based on the first message;
   receiving, from a user equipment (UE), a second message for requesting the event, the second message including an event identifier for the event, wherein the event is associated with the first opening mediation server;
   performing the event based on second message;

identifying whether a same event as the performed event is registered in the second opening mediation server; and transmitting, to the second opening mediation server, a request message for requesting deletion of the same event as the performed event in case that the same event as the performed event is registered in the second opening mediation server.

2. The method of claim 1, further comprising:
transmitting, to the at least one opening mediation server, a request message for requesting deletion of the event in case that the event identifier is unrecognizable; and
receiving, from the at least one opening mediation server, a response message including a deletion result of the event.

3. The method of claim 1, further comprising:
transmitting, to the at least one opening mediation server, a third message based on the first message; and
receiving, from the at least one opening mediation server, a fourth message including an event registration result.

4. The method of claim 1, wherein the identifying comprises identifying a same event as the performed event is registered based on the event identifier in the second opening mediation server.

5. The method of claim 1, further comprising:
determining whether an information list of at least one alternative opening mediation server is present based on the first message; and
transmitting a message for requesting event registration to a specific opening mediation server within the information list of the at least one alternative opening mediation server.

6. The method of claim 5, further comprising:
determining whether an information list of at least one root opening mediation server is present in case that the information list of the at least one alternative opening mediation server is not present; and
transmitting the message for requesting event registration to all the opening mediation servers within the information list of the at least one root opening mediation server.

7. The method of claim 1, wherein the information on the opening mediation server includes at least one of a fully qualified domain name (FQDN) and an object identifier IP address.

8. A server comprising:
a transceiver configured to transmit and receive at least one signal; and
a controller configured to be coupled to the transceiver, wherein the controller is configured to:
receive, from a mobile network operator, a first message including an embedded universal integrated circuit card (eUICC) identifier, first information on a first opening mediation server and second information on a second opening mediation server,
generate an event based on the first message,
register the event in the first opening mediation server based on the first message,
register the event in the second opening mediation server based on the first message,
receive, from a user equipment (UE), a second message for requesting the event, the second message including an event identifier for the event, wherein the event is associated with the first opening mediation server,
perform the event based on second message,
identify whether a same event as the performed event is registered in the second opening mediation server, and
transmit, to the second opening mediation server, a request message for requesting deletion of the same event as the performed event in case that the same event as the performed event is registered in the second opening mediation server.

9. The server of claim 8, wherein the controller is further configured to:
transmit, to the at least one opening mediation server, a request message for requesting deletion of the event in case that the event identifier is unrecognizable, and
receive, from the at least one opening mediation server, a response message including a deletion result of the event.

10. The server of claim 8, wherein the controller is further configured to:
transmit, to the at least one opening mediation server, a third message based on the first message, and
receive, from the at least one opening mediation server, a fourth message including an event registration result.

11. The server of claim 8, wherein the controller is further configured to identify a same event as the performed event is registered based on the event identifier in the second opening mediation server.

12. The server of claim 8, wherein the controller is further configured to:
determine whether an information list of at least one alternative opening mediation server is present based on the first message, and
transmit a message for requesting event registration to a specific opening mediation server within the information list of the at least one alternative opening mediation server.

13. The server of claim 12, wherein the controller is further configured to:
determine whether an information list of at least one root opening mediation server is present in case that the information list of the at least one alternative opening mediation server is not present, and
transmit the message for requesting event registration to all the opening mediation servers within the information list of the at least one root opening mediation server.

14. The server of claim 8, wherein the information on the opening mediation server includes at least one of a fully qualified domain name (FQDN) and an object identifier IP address.

* * * * *